United States Patent [19]
Jinbo et al.

[11] Patent Number: 5,673,159
[45] Date of Patent: Sep. 30, 1997

[54] MAGNETIC DISK APPARATUS

[75] Inventors: Masaki Jinbo; Tsuyoshi Furukawa; Hisashi Kaneko; Masaharu Sugimoto; Tsuneyori Ino; Shinichi Fukuzawa; Katsuaki Ishida, all of Kawasaki, Japan

[73] Assignee: Fujitsu Limited, Kawasaki, Japan

[21] Appl. No.: 745,223

[22] Filed: Nov. 8, 1996

Related U.S. Application Data

[63] Continuation of Ser. No. 268,851, Jun. 30, 1994, abandoned.

[30] Foreign Application Priority Data

Aug. 30, 1993 [JP] Japan .................... 5-237455

[51] Int. Cl.$^6$ .................................. G11B 17/02
[52] U.S. Cl. ................................... 360/98.01
[58] Field of Search ............... 360/97.01, 97.02, 360/97.03, 97.04, 98.01

[56] References Cited

U.S. PATENT DOCUMENTS

| | | | |
|---|---|---|---|
| 4,899,237 | 2/1990 | Tochiyama et al. | 360/98.02 |
| 5,142,425 | 8/1992 | Gailbreath, Jr. et al. | 360/97.02 |

FOREIGN PATENT DOCUMENTS

0427490A2  5/1991  European Pat. Off. .

*Primary Examiner*—Robert S. Tupper
*Attorney, Agent, or Firm*—Greer, Burns & Crain, Ltd.

[57] ABSTRACT

Disclosed is a magnetic disk apparatus having a large internal accommodation space. This magnetic disk apparatus comprises a case defining accommodation space inside, magnetic disks disposed in the accommodation space, a spindle motor, magnetic heads and a rotary actuator. The case includes a cover having a first flat portion and a first upright portion standing upright on the first flat portion at a peripheral portion thereof, and a base having a second flat portion and a second upright portion standing upright on the second flat portion at a peripheral portion thereof. This design can ensure a sufficient strength even if the case is made thin, thus allowing the internal accommodation space to be increased. The magnetic disk apparatus also has a printed circuit board, which is provided at the case and has a control circuit mounted thereon for controlling the magnetic heads. The printed circuit board supplies a source voltage to the case. Accordingly, the magnetic disks and the magnetic heads can be kept at the same potential via the case.

5 Claims, 21 Drawing Sheets

MAGNETIC DISK APPARATUS

This application is a continuation of application Ser. No. 08/268,851, filed on Jun. 30, 1994, now abandoned.

BACKGROUND OF THE INVENTION

1. Field of the Invention

The present invention relates to a magnetic disk apparatus, and, more particularly, to a magnetic disk apparatus which has large internal accommodation space.

2. Description of the Related Art

Recent magnetic disk apparatuses have been designed to become more compact and slim. To increase the memory capacity of magnetic disk apparatuses, there are efforts to improve the recording density of magnetic disks and increase the number of installed magnetic disks. The number of installed magnetic disks is increased by a scheme of designing each magnetic disk thinner or a scheme of narrowing the gaps between magnetic disks. Since there are certain limits to the thickness of magnetic disks and the gaps therebetween, however, it is demanded that the case of a magnetic disk apparatus, which supports the spindle motor for rotating the magnetic disks and the actuator, be designed slimmer.

FIGS. 21A, 21B and 21C are explanatory diagrams for the prior art. FIG. 21A is an internal cross section as viewed from the side, FIG. 21B is a perspective view from the side, and FIG. 21C is an internal cross section as viewed from the top.

As shown in FIG. 21A, the case of the magnetic disk apparatus has a base 91 and a cover 90. The base 91 is a rectangular parallelopiped which has the shape of a bath tub with one side open (upper side in the diagram). A spindle motor 94 rotates around a spindle shaft 93. The spindle motor 94 supports a plurality of magnetic disks 92 (four disks in the diagram). A rotary actuator 97 rotates around a fixed rotary shaft 96. The rotary actuator 97 has magnetic heads 95 attached at the distal end.

The spindle shaft 93 of the spindle motor 94 and the rotary shaft 96 of the rotary actuator 97 are secured to the base 91. FIG. 21C shows this arrangement from the above. A packing 98 is then provided on the base 91 for a sealing purpose as hatched in FIG. 21C, and the cover 90, a substantially single plate, is placed on the base 91. Then, the cover 90 is fastened to the base 91 by screws NS. FIG. 21B shows one side of the completed magnetic disk apparatus.

With this structure, in order to increase the number of installed magnetic disks by widening the internal space of the apparatus, the gaps between the magnetic disks should be narrowed. It is also necessary to make the base 91 and the cover 90 thinner. The conventional base 91 and cover 90 have thicknesses of about 4 mm.

The prior art has several shortcomings. First, the cover 90 is substantially a single plate, so that the rigidity of the cover 90, if made thin, would become considerably low. The rigidity of the base 91, even if made thin, would not be deteriorated so much due to its aforementioned rectangular parallelopiped shape.

The shaft 93 of the spindle motor 94 and the shaft 96 of the rotary actuator 97 are secured at their both ends to the base 91 and the cover 90. Because of the low rigidity of the cover 90, those sides of the shafts 93 and 96 which are supported by the cover 90 are likely to vibrate by the seek operation. The vibration interferes with the operation of positioning the magnetic heads 95. For instance, the residual vibration easily occurs, lengthening the seek time.

Secondly, the base 91 and cover 90 are generally made of an aluminum alloy, while the shafts 93 and 96 are made of stainless steel. Due to the difference between their coefficients of linear expansion, when the ambient temperature changes, the amount of contraction or expansion of the base 91 and cover 90 differs from that of the shafts 93 and 96. The deformation becomes more prominent on the cover 90 which has a low rigidity. Thus, the shaft 93 of the spindle motor 94 and the shaft 96 of the rotary actuator 97 tilt, causing a relative positional deviation between the magnetic disks 92 and magnetic heads 95. This results in an off-track, interfering with the data reading/writing.

Thirdly, according to the prior art, the packing 98 is used to seal the space between the base 91 and the cover 90. As a compact magnetic disk apparatus has small space in the planar direction, the base 91 and the cover 90 contacts only at the narrow portions where the screws are fastened as shown in FIG. 21C. The other portions are occupied by the packing 98 as indicated by the hatched portion in the diagram. The packing 98 prevents air flow from outside the apparatus to inside or vice versa.

The electromagnetic noise component, such as an electric wave, coming from outside the apparatus cannot be cut off by the packing 98. The electromagnetic noise therefore enters the apparatus and becomes noise at the time of reading or writing data by the magnetic heads 95. As mentioned above, the recording density has been improved recently. The magnetic disk apparatus thus becomes more susceptible to noise, causing a read error due to the external electric wave noise.

SUMMARY OF THE INVENTION

It is therefore a primary object of the present invention to provide a magnetic disk apparatus whose case portion is designed thin to increase the internal accommodation space.

It is another object of the present invention to provide a magnetic disk apparatus which can prevent the occurrence of a vibration and an off-track even its case portion is designed thin.

It is a further object of the present invention to provide a magnetic disk apparatus which is less susceptible to an external noise.

It is a still further object of the present invention to provide a magnetic disk apparatus which prevents magnetic heads from being damaged.

According to one aspect of this invention, there is provided a magnetic disk apparatus comprising a case defining an accommodation space inside and including a cover having a first flat portion and a first upright portion standing upright on the first flat portion at a peripheral portion thereof, and a base having a second flat portion and a second upright portion standing upright on the second flat portion at a peripheral portion thereof; magnetic disks disposed in the accommodation space; a spindle motor rotatable around a shaft having both ends secured to the case, for rotating the magnetic disks; magnetic heads for reading and writing data from and on the magnetic disks; and a rotary actuator for supporting the magnetic heads at a distal end, the rotary actuator being rotatable around a shaft having both ends secured to the case.

According to this aspect, the cover of the case has a top plate and an upright portion formed at the peripheral portion of the top plate to define the accommodation space. That is, the cover and base are designed to have similar shapes. Since the cover, like the base, has a shape having a surrounding side wall, it has substantially the same rigidity as the base. Even if the base and cover are designed thin, the aforementioned vibration and off-track can be prevented. The internal accommodation space can therefore be increased without deteriorating the performance of the magnetic disk apparatus.

When the spindle motor and actuator are assembled on the base of the conventional structure, they cannot be seen from the sides so that the relative heights of the magnetic disks and magnetic heads cannot be checked. According to the present invention, by contrast, the base has almost half the height of the conventional base, so that the upper half portions of the spindle motor and actuator can be seen from the sides before the cover is attached. The relative heights can thus be checked, facilitating the height adjustment.

According to another aspect of this invention, there is provided a magnetic disk apparatus comprising a case defining an accommodation space inside; magnetic disks disposed in the accommodation space; a spindle motor rotatable around a shaft having both ends secured to the case, for rotating the magnetic disks; magnetic heads for reading and writing data from and on the magnetic disks; a rotary actuator for supporting the magnetic heads at a distal end, the rotary actuator being rotatable around a shaft having both ends secured to the case; and a printed circuit board provided at the case and having a control circuit mounted thereon for controlling the magnetic heads, the rotary actuator and the spindle motor, the printed circuit board supplying a source voltage to the case.

The magnetic disk apparatus according to the second aspect of this invention is designed in consideration that the read head of each magnetic head is a magneto-resistive (MR) element or the like which is applied a voltage. The MR heads are easily damaged if there is a potential difference between the MR heads and the magnetic disks. As the MR heads are electrically connected to the external printed circuit board on which the control circuit is mounted, the MR heads have the potential of the printed circuit board. To eliminate the potential difference between the MR heads and magnetic disks, the magnetic disks should have the potential of the printed circuit board. In this respect, the printed circuit board is electrically connected to the case to supply the source voltage to the case from the printed circuit board. As the magnetic disks are electrically connected to the case, the potential of the magnetic disks becomes that of the printed circuit board, thus preventing the MR heads from being damaged by the potential difference.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention.

DETAILED DESCRIPTION OF THE PREFERRED EMBODIMENTS

Figure 1:
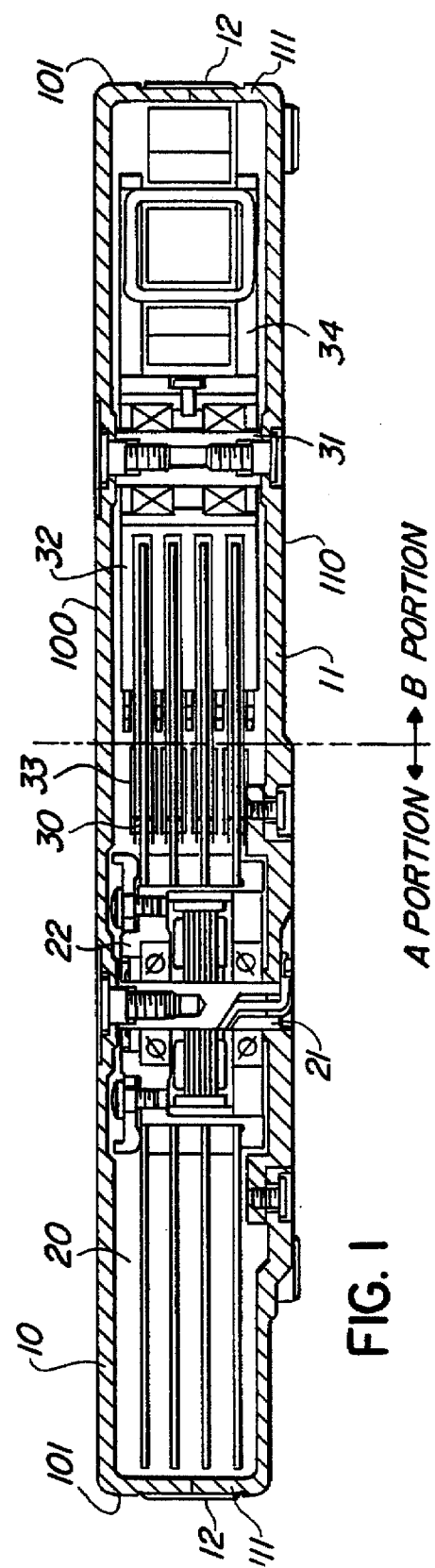
FIG. 1 is a cross-sectional view of a magnetic disk apparatus according to one embodiment of the present invention.
Figure 2:
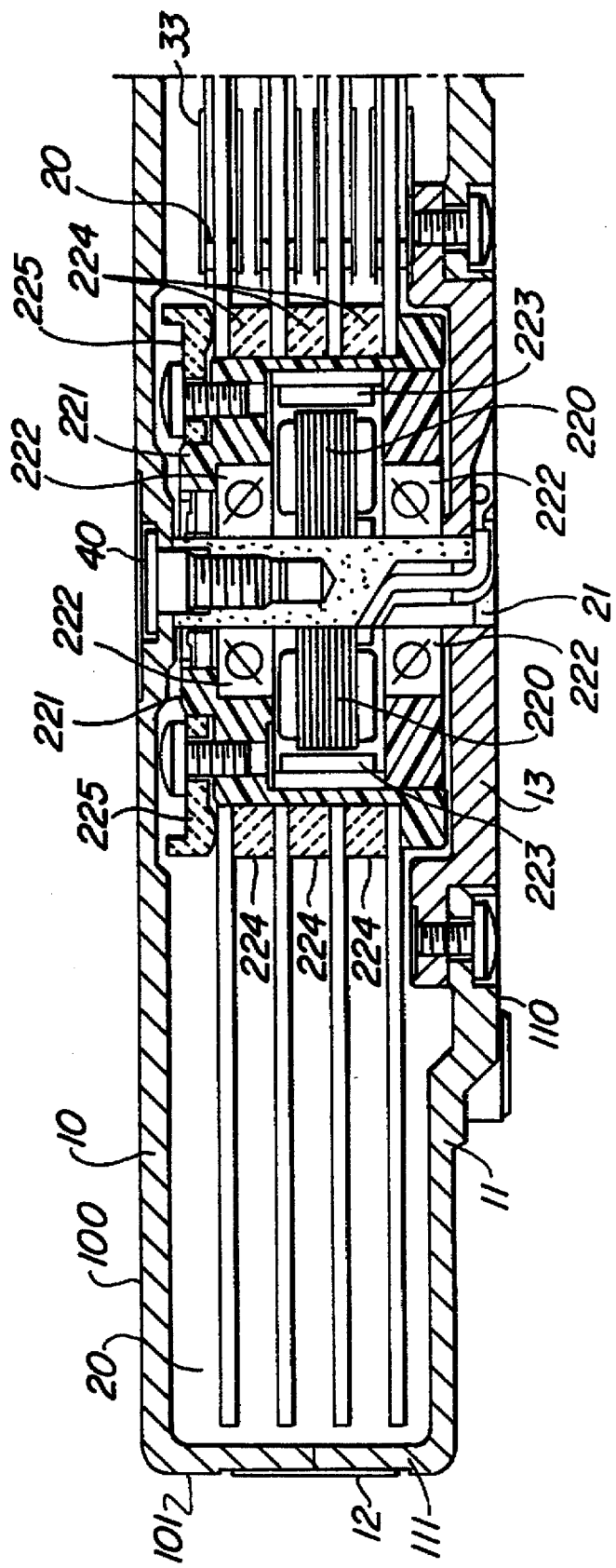
FIG. 2 is an enlarged view of a portion A in FIG. 1.
Figure 3:
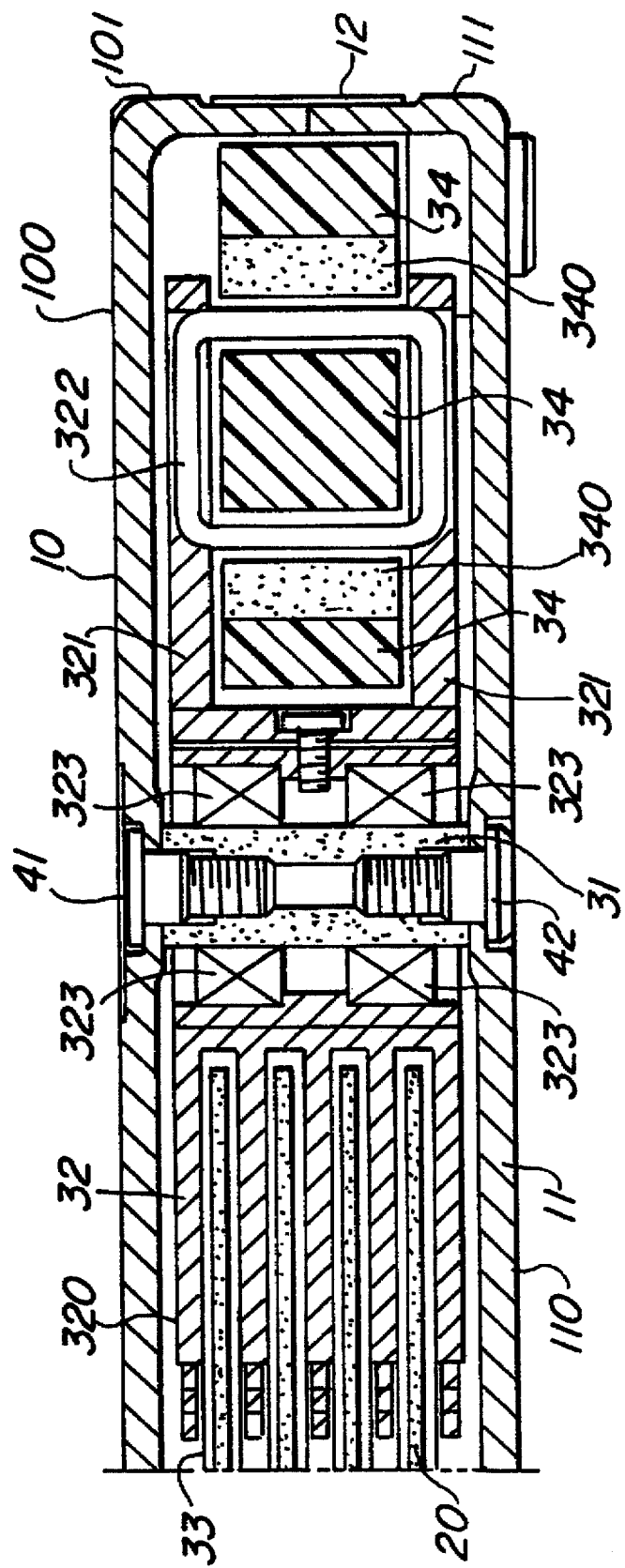
FIG. 3 is an enlarged view of a portion B in FIG. 1.
Figure 4:
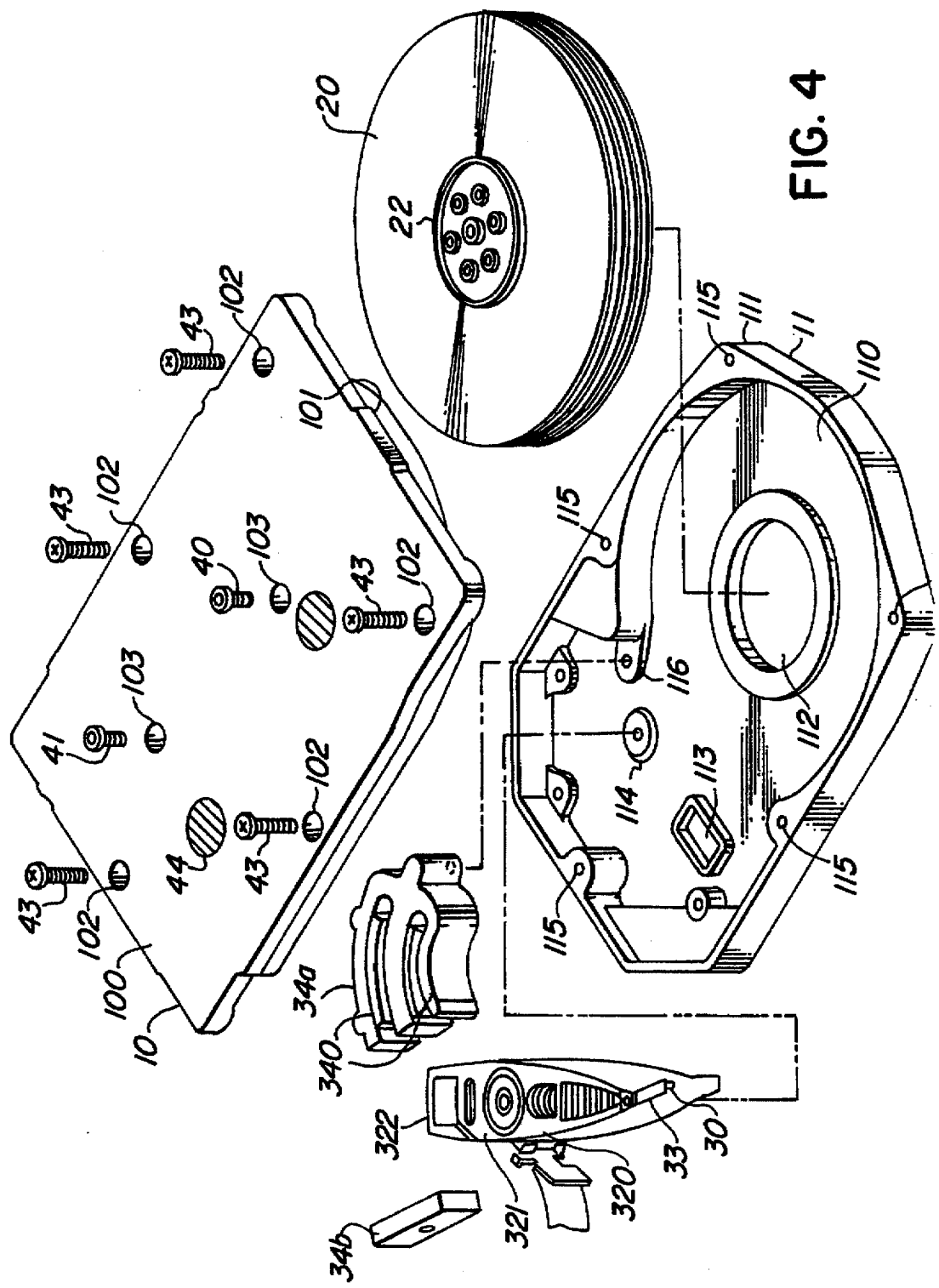
FIG. 4 is an exploded view of the magnetic disk apparatus in FIG. 1.
Figure 5:
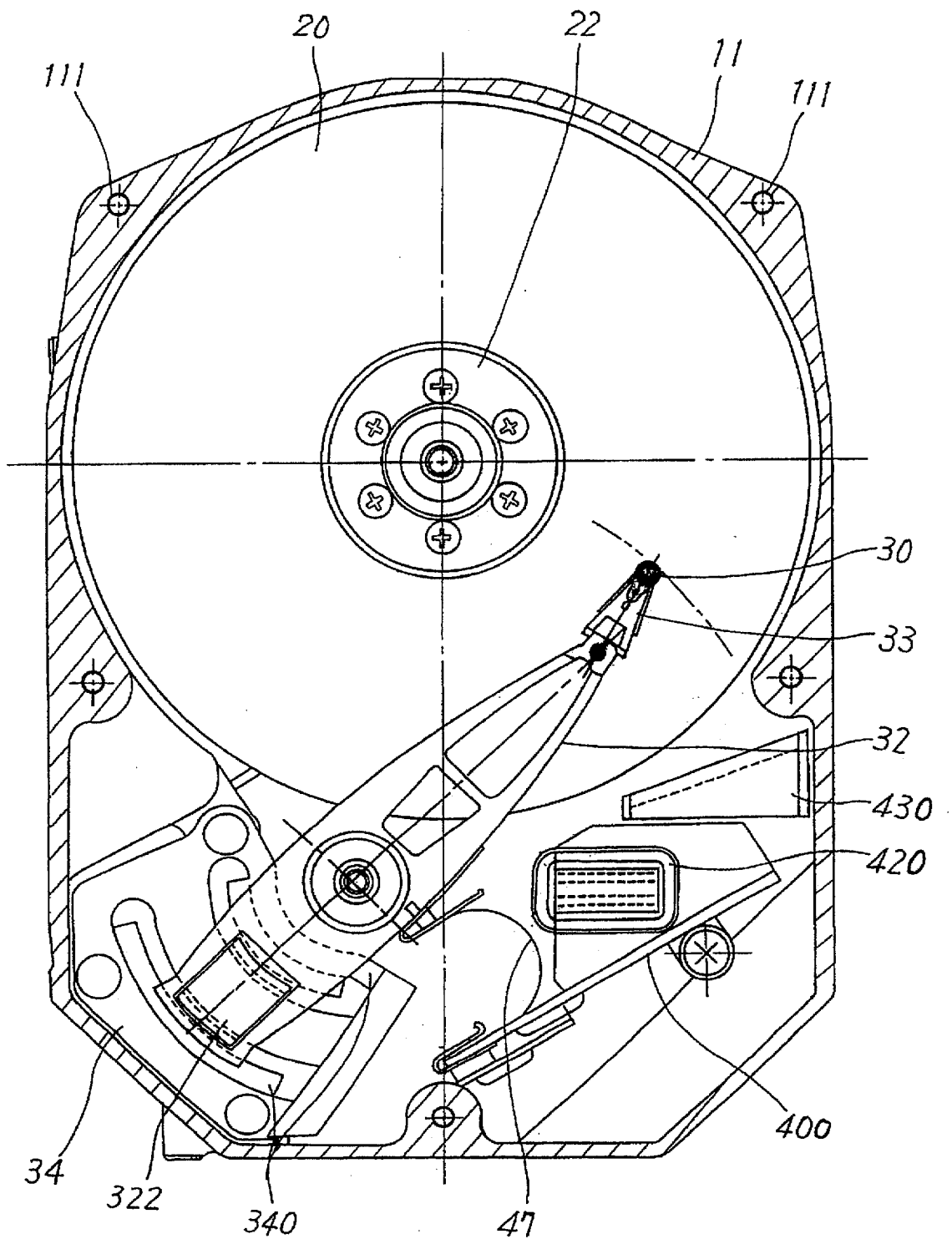
FIG. 5 is a top cross-sectional view of the magnetic disk apparatus in FIG. 1.
Figure 6:
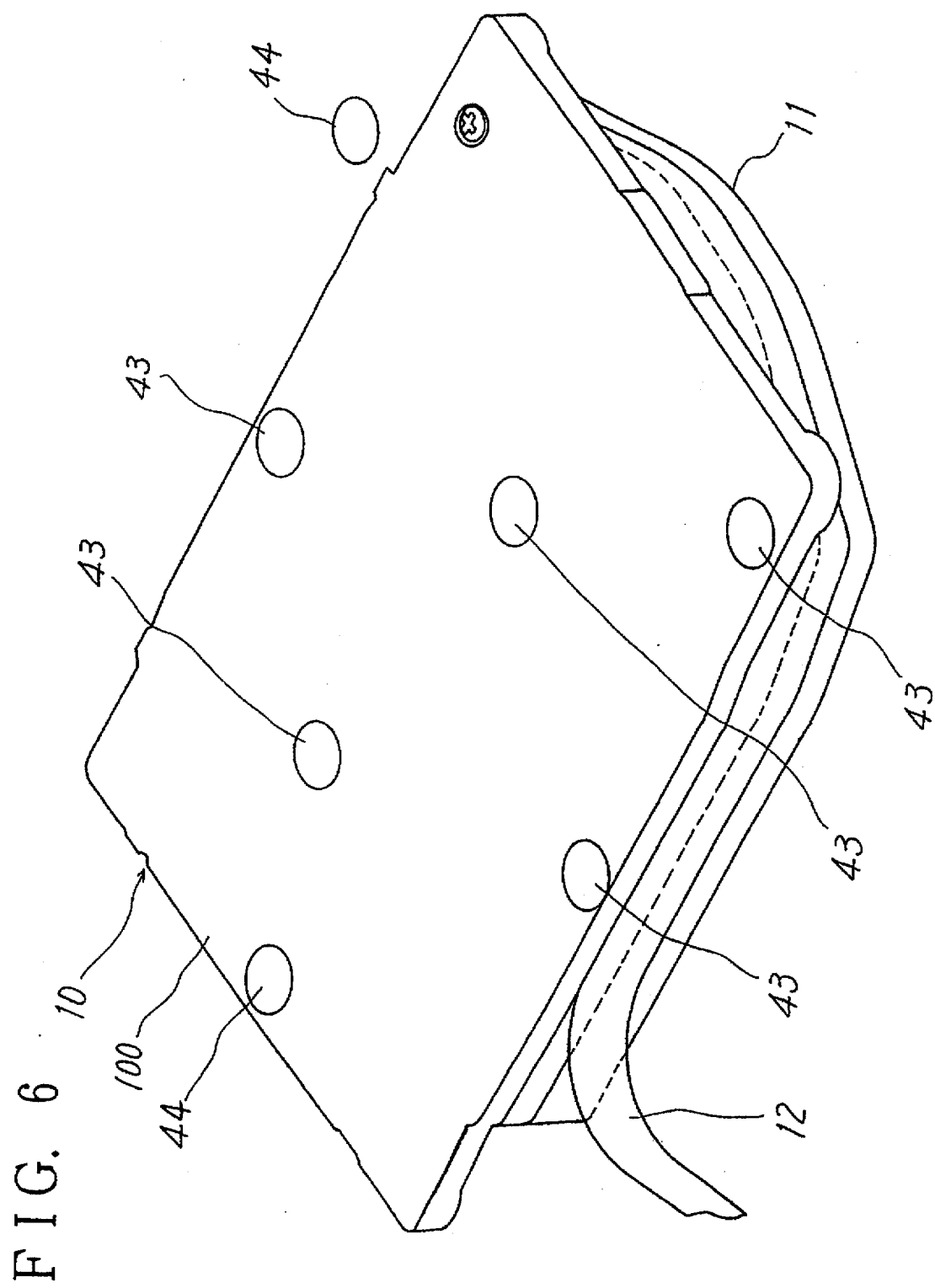
FIG. 6 is a diagram for explaining the assembly of the magnetic disk apparatus in FIG. 1.
Figure 7:
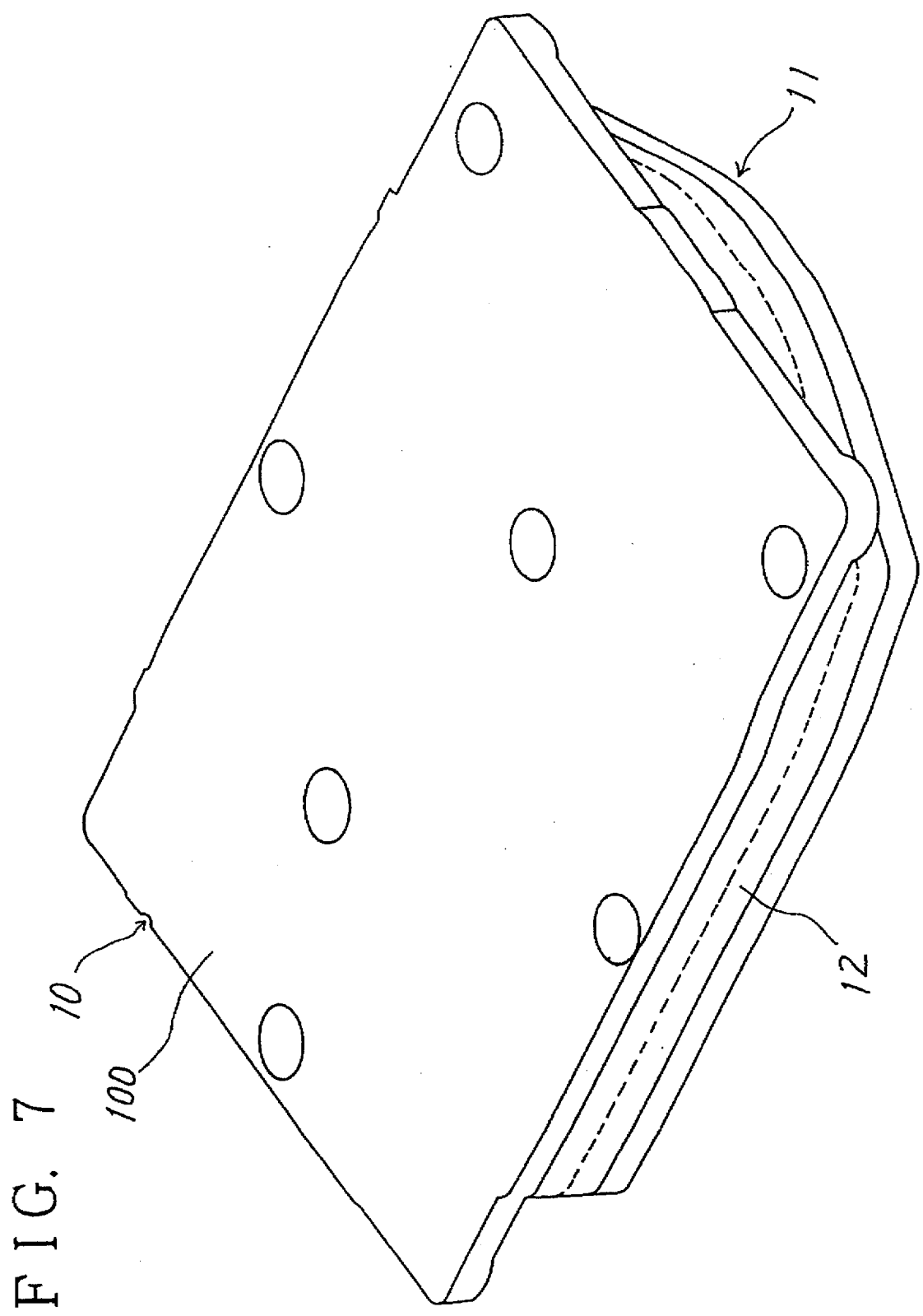
FIG. 7 is a perspective view of the magnetic disk apparatus in FIG. 1.
Figure 8:
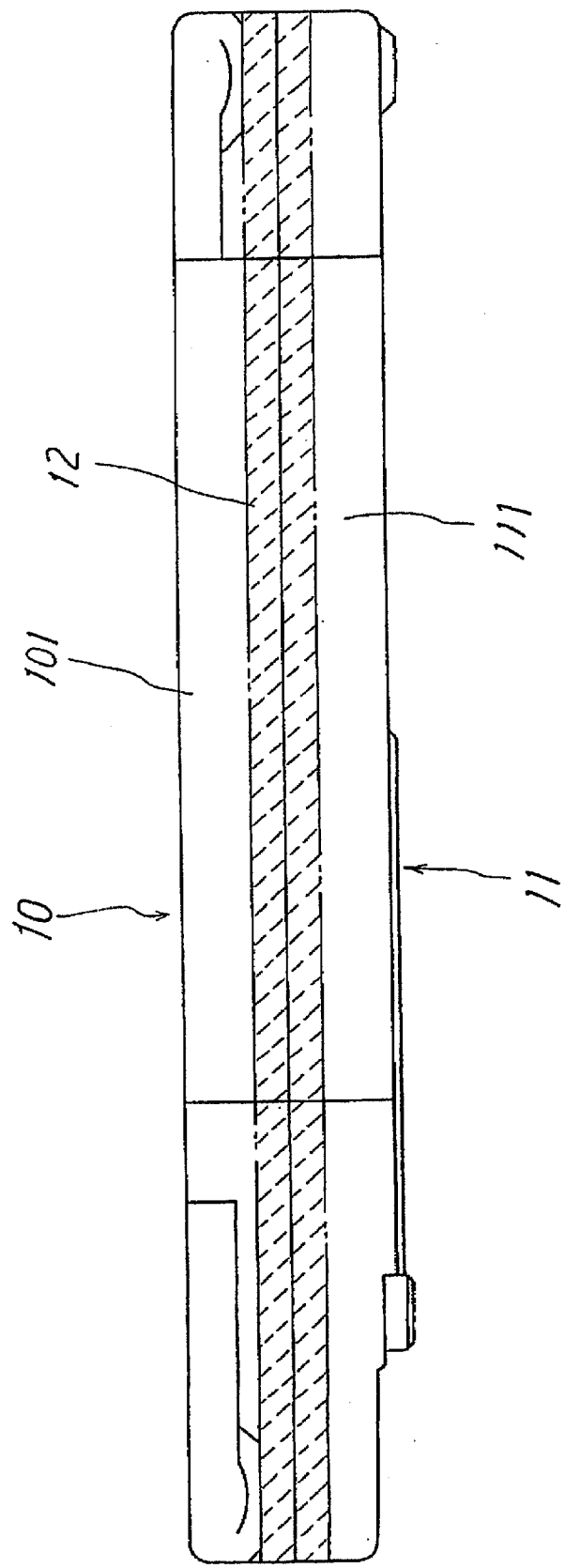
FIG. 8 is a side view of the magnetic disk apparatus in FIG. 1.

FIG. 1 is a cross-sectional view of a magnetic disk apparatus, FIG. 2 is an enlarged view of a portion A in FIG. 1, FIG. 3 is an enlarged view of a portion B in FIG. 1, FIG. 4 is an exploded view of the magnetic disk apparatus in FIG. 1, FIG. 5 is a top cross-sectional view of the magnetic disk apparatus in FIG. 1, FIG. 6 is a diagram for explaining the assembly of the magnetic disk apparatus, FIG. 7 is a perspective view of the completed magnetic disk apparatus, and FIG. 8 is a side view of the magnetic disk apparatus in FIG. 7.

As shown in FIG. 1, a base 11 has a second upright portion 111 formed at the periphery of a flat portion 110, and thus has a cross section with a bath-tub shape. Likewise, a cover 10 has a first upright portion 101 formed at the periphery of a flat portion 100, and thus has a cross section with a bath-tub shape. The first upright portion 101 of the cover 10 is placed against the second upright portion 111 of the base 11, thus constituting a case having accommodation space inside.

Provided in the accommodation space defined by the cover 10 and base 11 is a spindle motor 22 which rotates around a shaft 21 that has both ends supported to the cover 10 and base 11. Four magnetic disks 20 are mounted on the spindle motor 22. Provided inside the accommodation space on the right side is a rotary actuator 32 which rotates around a shaft 31 that has both ends supported to the cover 10 and base 11. Attached to the distal end of this rotary actuator 32 are spring arms 33 each having a magnetic head 30 provided at its distal end.

The spindle motor 22 will now be described with reference to FIG. 2. As shown in FIG. 2, the lower portion of the shaft 21 is pressed into a flange 13. The flange 13 is inserted in the flat portion 110 of the base 11. The top portion of the shaft 21 is fastened to the flat portion 100 by a screw 40. A coil 220 is provided around the shaft 21. A motor hub 221 is provided around the shaft 21 via a pair of bearings 222.

A magnet 223 is provided at the inner wall of the motor hub 221 which faces the coil 220. The four magnetic disks 20 are fitted on the motor hub 221, and are separated from one another by partition rings 224. The topmost magnetic disk 20 is securely pressed by a pressure ring 225.

The motor hub 221 of the spindle motor 22 rotates around the fixed shaft 21 by the current supplied to the coil 220. Accordingly, the magnetic disks 20 secured to the motor hub 221 rotate.

The rotary actuator 32 will be described below with reference to FIG. 3. As shown in FIG. 3, the lower portion of the shaft 31 is fastened to the flat portion 110 of the base 11 by a screw 42 while the upper portion of the shaft 31 is fastened to the flat portion 100 of the cover 10 by a screw 41. Provided around the shaft 31 is a bearing 323 through which the actuator 32 is provided.

The actuator 32 has five arms 320 on the left-hand side of the shaft 31 in the diagram. Each arm 320 is provided with the aforementioned spring arm 33, and the magnetic head 30 (see FIG. 2) is attached to the distal end of this spring arm 33. The magnetic head 30 has an MR (Magnet-Resistive) element as a read head and an inductive element as a write head.

The actuator 32 also has a pair of coil support blocks 321 on the right-hand side of the shaft 31 in the diagram. The pair of coil support blocks 321 are provided with a drive coil 322 as shown in FIG. 3. Located on the right and left sides and inside the drive coil 322 is a yoke 34 that is secured to the base 11. Magnets 340 are provided on the right and left sides of the yoke 34 which face the right and left sides of the drive coil 322.

As a current is supplied to the drive coil 322, therefore, the actuator 32 rotates around the shaft 31, causing each magnetic head 30 to move in the radial direction of the associated magnetic disk 20.

The base 11 has the upright portion 111 formed at the periphery of the flat portion 110 as shown in FIG. 4. Formed in the flat portion 110 are a mount hole 112 for the spindle motor 22, a connector hole 113, a mount hole 114 for the actuator 32, and a hole 116 for securing the yoke 34. The end face of the upright portion 111 is formed flat and has five screw holes 115 formed therein for the attachment of the base 11 to the cover 10.

Referring now to FIG. 5, the spindle motor 22 to which the magnetic disks 20 are attached is mounted into the mount hole 112. The yoke 34 has one part 34a attached to the hole 116, and the rotary actuator 32 is mounted into the mount hole 114. The other part 34b of the yoke 34 is attached to the yoke 34a.

A connector 420 (see FIG. 5) is attached to the connector hole 113. A cable hold plate 400 (see FIG. 5) is attached to the flat portion 110. To form a connecting path to the magnetic heads 30, a flexible printed cable (FPC) 47 provided at the actuator 32 is held by the cable hold plate 400 and has its one end connected to the connector 420. A circulating filter 430 is provided at the flat portion 110 of the base 11 to clean the inside air.

As shown in the top cross-sectional view of FIG. 5, the spindle motor 22, the rotary actuator 32, etc. are mounted on the base 11. In this diagram, the hatched end face of the flat portion 111 of the base 11 is flat.

Returning to FIG. 4, the cover 10 has five screw holes 102 and two screw holes 103 formed in the rectangular flat portion 100. Provided at the bottom of the flat portion 100 is the upright portion 100 whose shape matches with that of the upright portion 111 of the base 11. The end face of the upright portion 101 which contacts the upright portion 111 of the base is also flat.

The thus designed cover 10 is placed over the base 11 shown in FIG. 5 in such a way that the end face of the upright portion 101 of the cover 10 mates with the end face of the upright portion 111 of the base 11. Then, the screws 40 and 41 are fastened into the screw holes 103 of the flat portion 101 of the cover 10 to fix the shaft 21 of the spindle motor 22 and the shaft 21 of the rotary actuator 32 to the cover 10, as shown in FIG. 4. Likewise, the screws 43 are inserted into the screw holes 102 of the flat portion 101 of the cover 10 and fastened into the screw holes 115 of the upright portion 111 of the base 11, thus securing the cover 10 to the base 11.

Next, an insulating seal 44 is adhered to the head of the screws 43 and the head of the screw 41. This provides air-tight sealing at those portions, as shown in FIG. 6. Further, an insulating adhesive tape 12 is put around along the mated position between the upright portion 101 of the cover and the upright portion 111 of the base 11. Accordingly, the magnetic disk apparatus is completed as shown in the perspective view of FIG. 7 and the side view of FIG. 8.

As the cover 10 and base 11 are respectively provided with the upright portions 101 and 111, the cover 10, like the base 11, has a shape having a surrounding side wall. The cover 10 therefore has substantially the same rigidity as the base 11. Even if the base 11 and cover 10 are made thin, the vibration of the shafts and the occurrence of an off-track can be prevented. The accommodation space inside the magnetic disk apparatus can therefore be increased to retain more magnetic disks without deteriorating the performance of the apparatus.

Since the mating surfaces of the base 11 and cover 10 are both flat, not rough, and the base 11 and cover 10 contact at the entire hatched surface in FIG. 5, it is possible to eliminate a clearance from which external electric wave noise enters. Further, as the base 11 and cover 10 contact at the wide surface, the coupling strength between them can be increased. In addition, as the adhesive tape 12 is stuck at the mated position between the cover 10 and base 11, the air-tight sealing can be secured.

As shown in FIG. 5, the angles of the bending portions (seven in the diagram) at the periphery of the upright portion 111 are greater than 90 degrees. This facilitates the adhesion of the adhesive tape 12 and makes the separation of the adhered tape 12 difficult.

The base 11 and cover 10 are formed by an aluminum diecast, in which aluminum is supplied inside a die and a resultant article is ejected later. It is therefore necessary to provide tapers toward the upright portion 111 of the base 11 or the upright portion 101 of the cover 10. The distal end of the tall upright portion of the conventional base 91 becomes thin, whereas the upright portion 111 of the base 11 in the present invention, which is about half the height of the conventional upright portion, the thickness of the distal end of the upright portion 111 which should be reduced by the taper becomes a half. The strength of the base 11 can be further enhanced.

Furthermore, when the spindle motor 94 and actuator 97 are assembled on the base 91 of the conventional structure, they cannot be seen from the sides so that the relative heights of the magnetic disks 92 and magnetic heads 95 cannot be checked. According to the present invention, by contrast, the base 11 needs to have almost half the height of the conventional base 91, so that the upper half portions of the spindle motor 22 and actuator 32 can be seen from the sides before the cover 10 is attached. The relative heights can thus be checked, facilitating the height adjustment.

Figure 9:
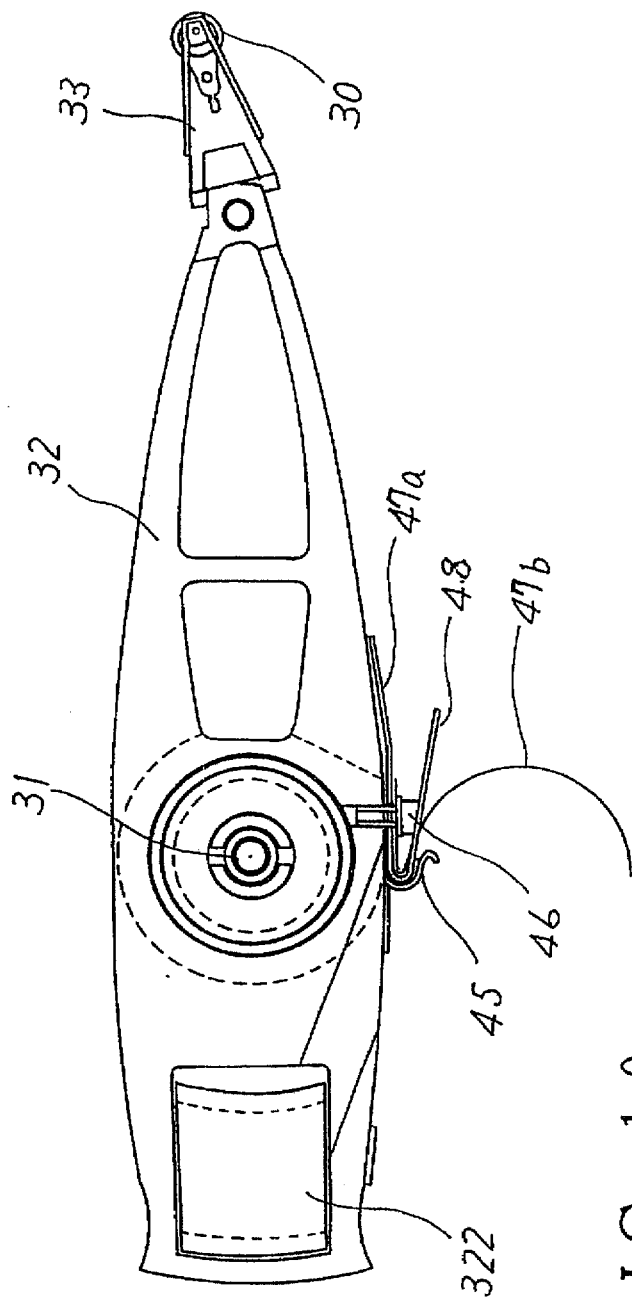
FIG. 9 is a top view of a rotary actuator.
Figure 10:
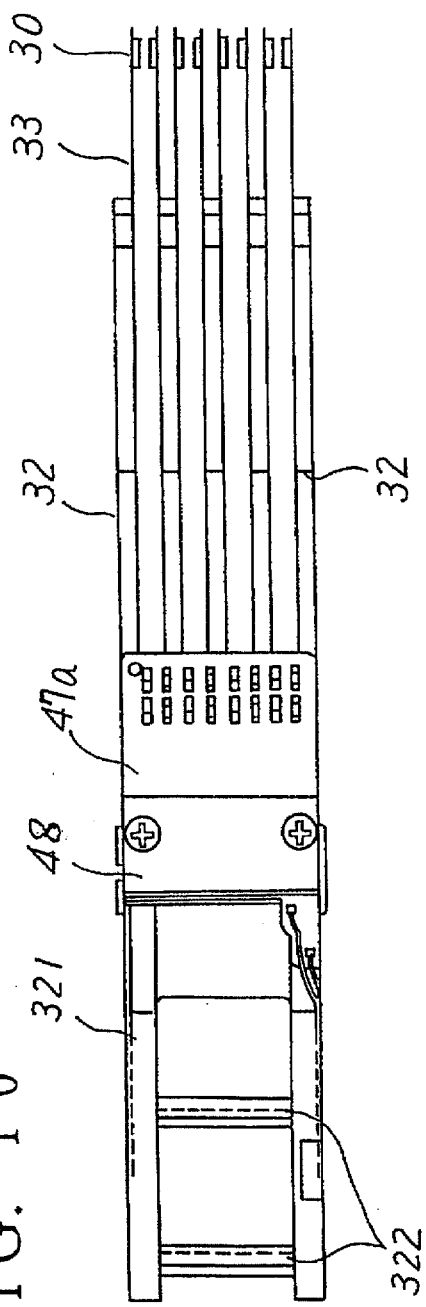
FIG. 10 is a side view of the rotary actuator.
Figure 11:
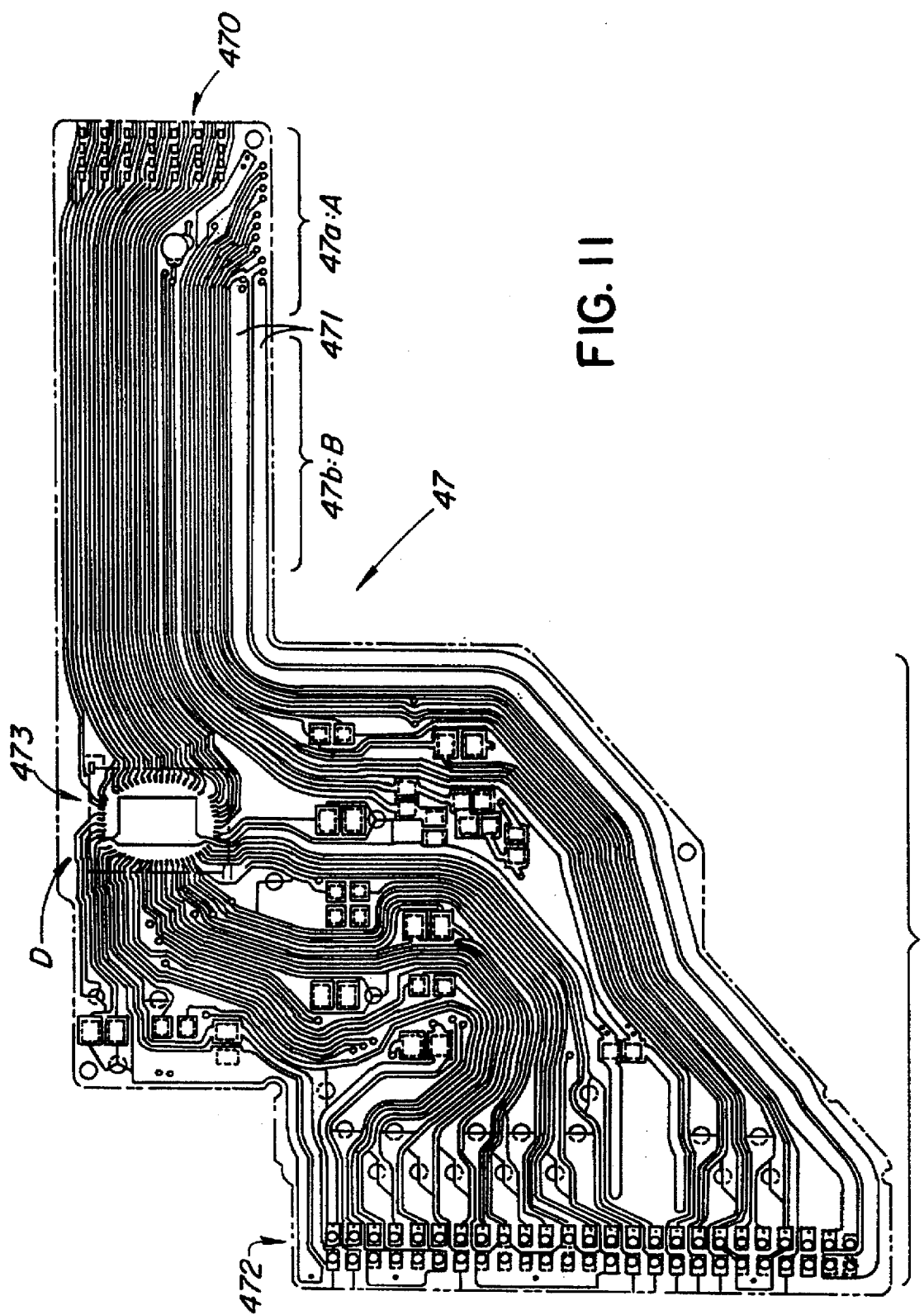
FIG. 11 is a front view of an FPC (Flexible Printed Cable)
Figure 12A:
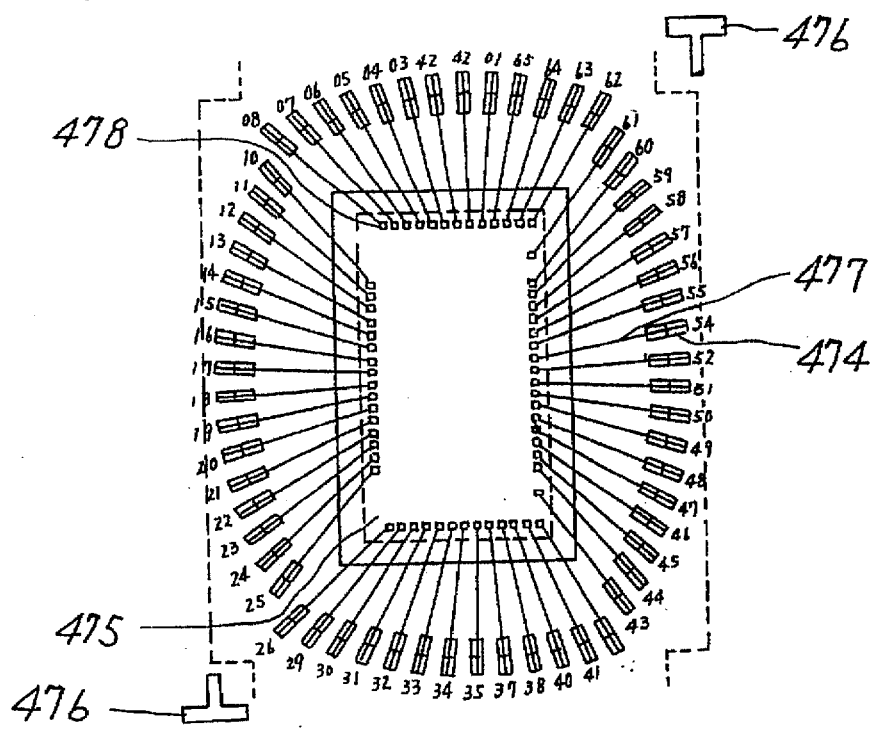
FIG. 12A is an enlarged view of a portion D in FIG. 11.
Figure 12B:
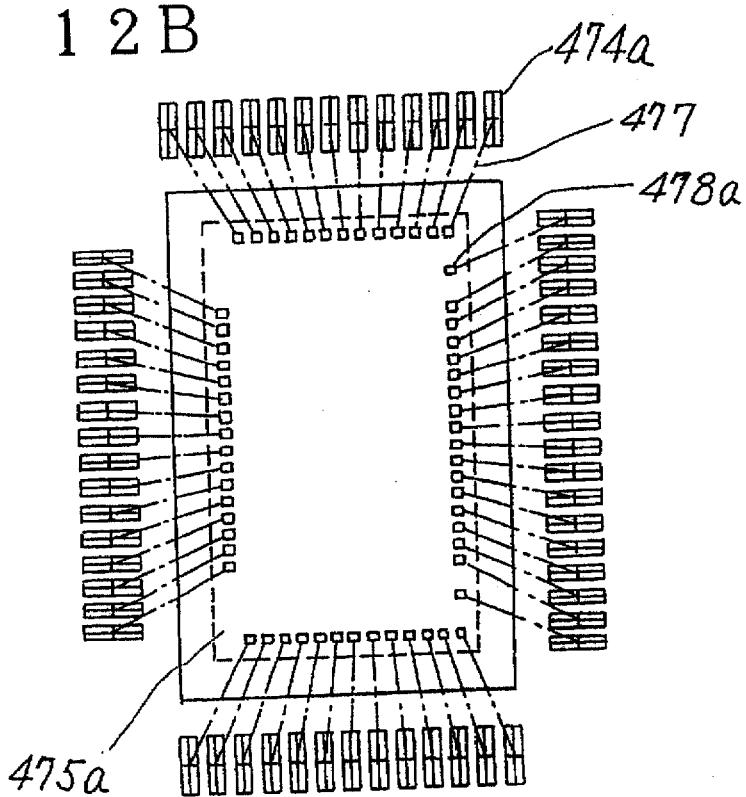
FIG. 12B is an explanatory diagram of a comparative example of the portion in FIG. 12A.
Figure 13A:
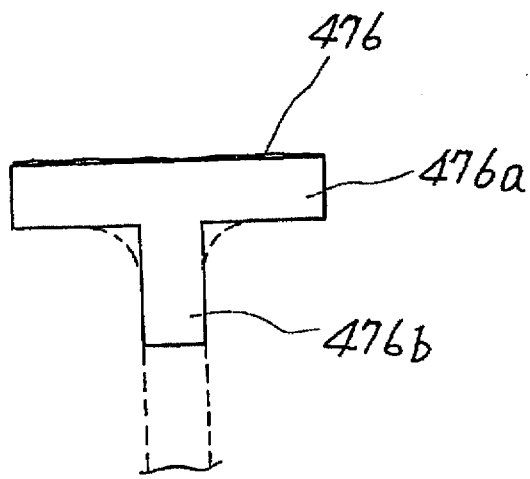
FIG. 13A is an explanatory diagram of a positioning pattern shown in FIG. 12A.
Figure 13B:
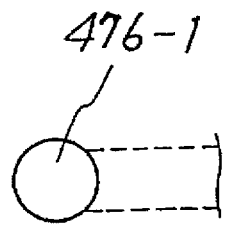
FIGS. 13B and 13C are explanatory diagrams of a comparative example of the positioning pattern in FIG. 13A.
Figure 13C:
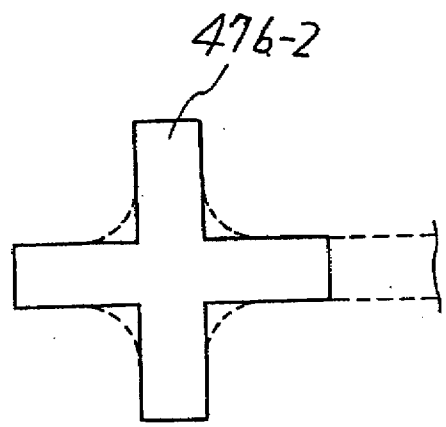
Figure 14:
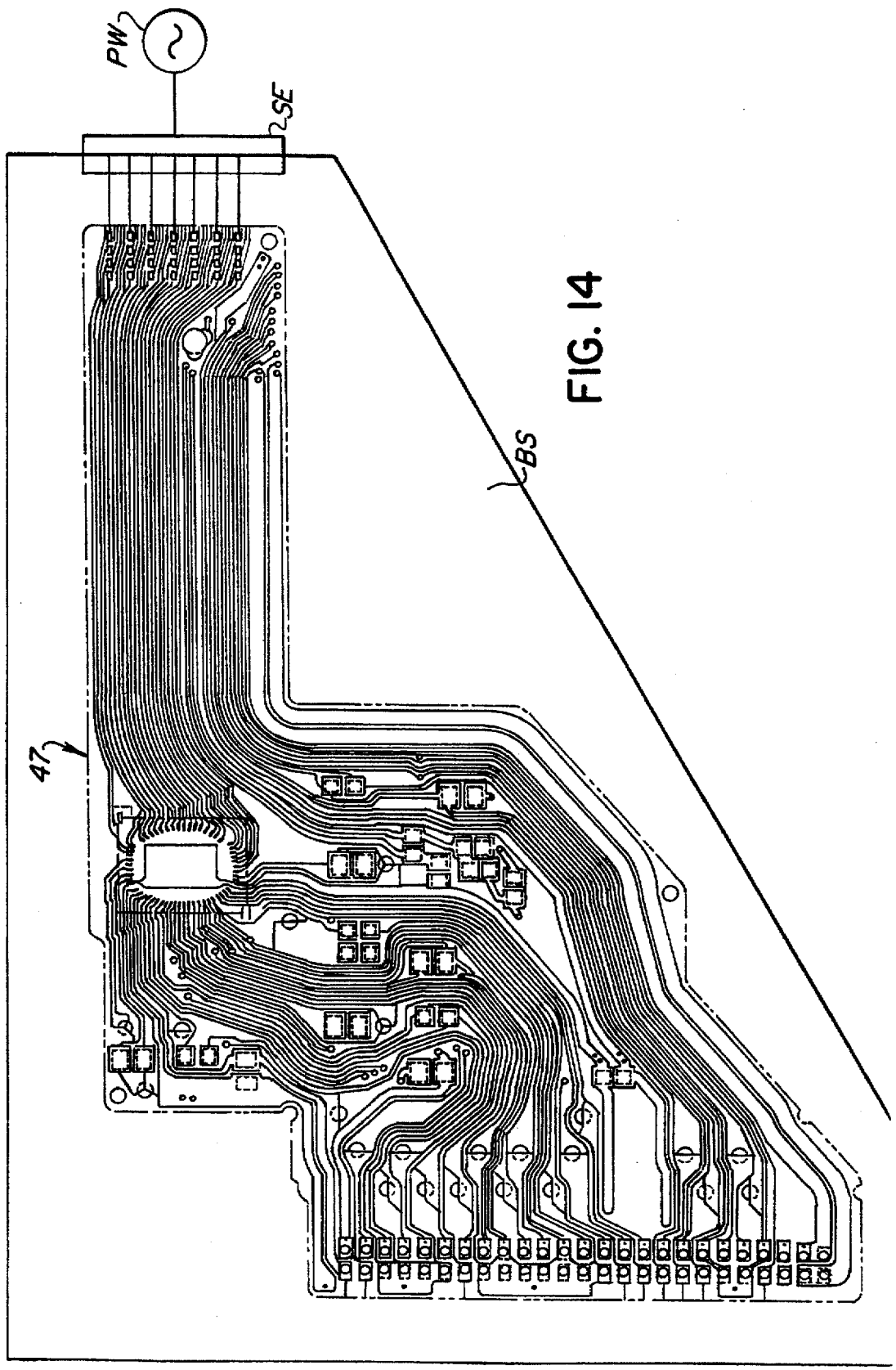
FIG. 14 is a diagram for explaining a process of plating the FPC in FIG. 11.
Figure 15:
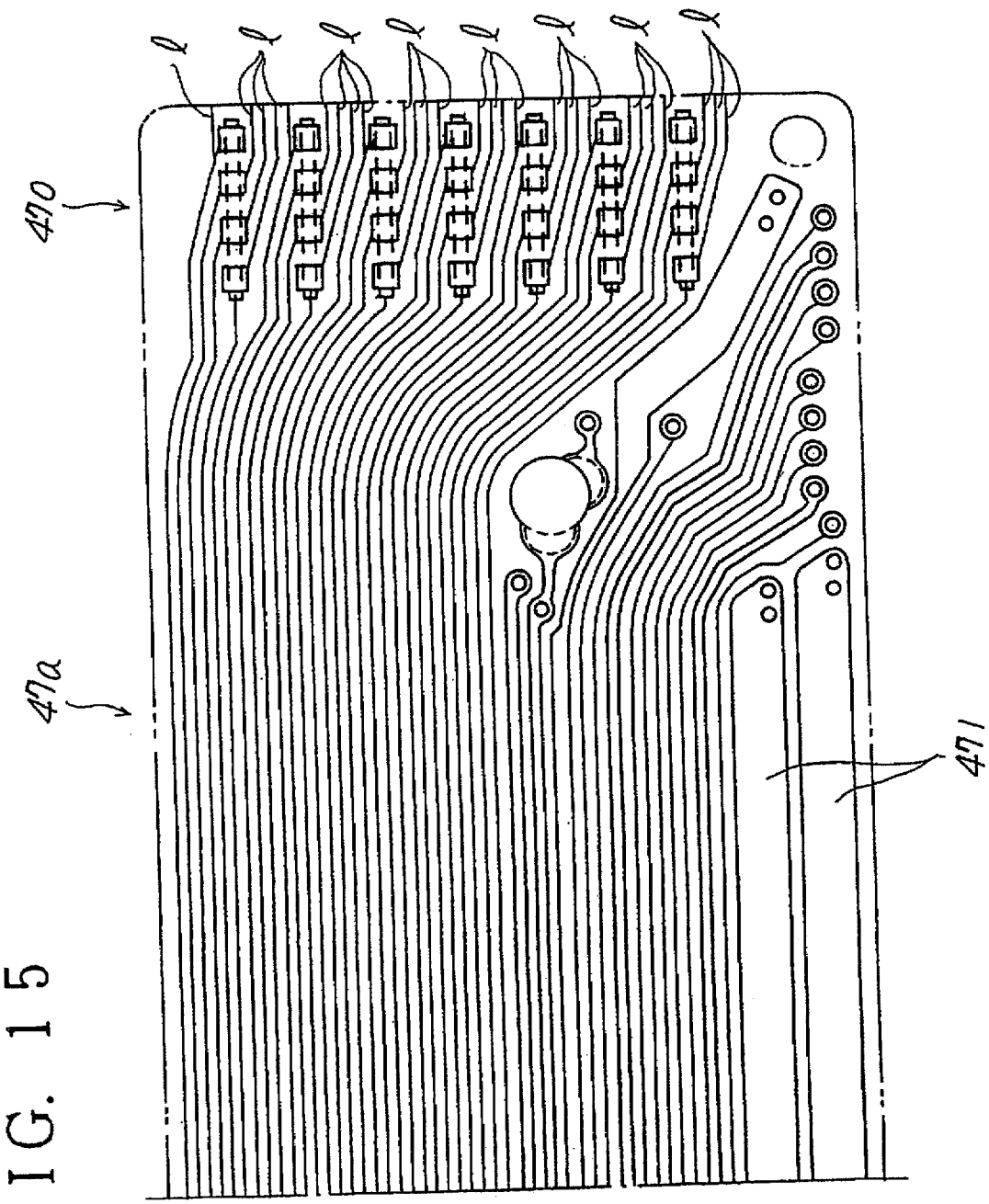
FIG. 15 is an enlarged view of a portion A in FIG. 11.

FIG. 9 is a top view of the rotary actuator, FIG. 10 is a side view of the rotary actuator, FIG. 11 is a front view of the FPC, FIGS. 12A and 12B are enlarged views of a portion D in FIG. 11, FIGS. 13A, 13B and 13C are explanatory diagrams of a positioning pattern shown in FIG. 11, FIG. 14 is a diagram for explaining a process of plating the FPC, and FIG. 15 is an enlarged view of a portion A in FIG. 11.

The rotary actuator 32 should be electrically connected to an external unit to transfer write data to the magnetic heads 30, transfer read data from the magnetic heads 30 and drive the drive coil 322. Since many signals lines are involved for those operations, the FPC 47 having those signal lines is used. As shown in FIG. 11, the FPC 47 is functionally separated into three parts: a head connecting portion (portion A) 47a on the right-hand side in the diagram, a flexible portion (portion B) 47b which is the middle part, and a fixed portion (portion C) 47c on the left-hand side in the diagram. The head connecting portion 47a has a plurality of head lands 470 for connection to the individual magnetic heads 30 and coil lands 471 for connection to the drive coil 322 of the rotary actuator 32.

The fixed portion 47c is provided with a head IC mount area (portion D) 473 on which a head IC for amplifying reproduced signals from the magnetic heads 30 are mounted, a connecting pad 472 to connect to the connector 420 (FIG. 5), connecting lines for connecting the connecting pad 472 to the head IC and connecting lines to connect to the coil lands 471. Further, the flexible portion 47b is provided with connecting lines for connecting the head lands 470 to the head IC and connecting lines to connect to the coil lands 471.

The FPC 47 is attached as shown in FIGS. 9 and 10. The head connecting portion 47a of the FPC 47 is held between a pair of C-shaped holders 45 and 48 and is attached to one side of the actuator 32 by screws 46.

The boundary between the head connecting portion 47a and the flexible portion 47b is bent by the pair of holders 45 and 48, and the flexible portion 47b is bent as shown in FIG. 9. The area of the fixed portion 47c around the aforementioned head IC mount area 473 is attached to the cable hold plate 400 shown in FIG. 5. The other area of the fixed portion 47c is formed in such a way that the connector 420 in FIG. 5 connected to the connecting pad 472 is fitted in the connector hole 113 shown in FIG. 4.

The head IC mount area or portion D of the FPC 47 will now be discussed. As shown in FIG. 12A, the head IC mount area D is provided with many lands 474 (sixty lands in this example) around the position where a head IC 475 is to be mounted.

The head IC 475 is mounted as a bare chip, and sixty lands 478 are also provided on the bare chip head IC 475. The lands 474 of the FPC 47 are plated with gold. Both lands 478 and 474 are bonded by gold wires 417. This wire bonding can accomplish the connection without damaging both lands 478 and 474.

Conventionally, the lands, 474a, of the FPC 47 are arranged in line along the periphery of the head IC 475a, as shown in FIG. 12B. When the lands 478a and the lands 474a have an oblique positional relationship as shown in FIG. 12B, the gold wires 477 should be laid out obliquely. The gold wires 477 are slightly slack at the connected portions.

Due to the slacking, each gold wire 477 may undesirably be connected to the adjacent land 474a to the target land 474a.

To prevent this misbonding, the lands 474 of the FPC 47 are arranged in a radial form around the head IC 475 as shown in FIG. 12A. As shown in FIG. 12A, therefore, the individual lands 474 are arranged to face the associated lands 478 of the head IC 475. Even if the lands 474 and lands 478 have an oblique positional relationship, each gold wire 477 can be prevented from being connected to the other lands 474 than the target land 474.

The head IC 475 is automatically mounted on the head mount area by an IC mounting machine. At this time, the IC mounting machine automatically recognizes the mounting position through image processing. For the purpose of the automatic recognition by the image processing, positioning marks 476 are provided at the upper right corner and lower left corner of the head mount area of the FPC 47 as shown in FIG. 12A. The positioning marks 476 are picked up by a CCD camera or the like, and the picked-up image is subjected to image processing to determine the mounting position.

A description of the positioning marks will now be given. Conventionally, patterns shown in FIGS. 13B and 13C have been used as the positioning marks. The pattern shown in FIG. 13B is a round positioning mark 476-1, which is relatively easy to form but with which it is difficult to accurately position the head IC 475 in the X and Y directions is difficult.

Another conventional positioning mark is a cross-shaped mark 476-2 shown in FIG. 13C. This positioning mark 476-2 can improve the positioning precision in the X and Y directions if the center of the cross can be detected. The cross-shaped positioning mark 476-2 is very small, about the size of 1 mm on each side, and is formed by an etching process, so that the cross shape cannot be formed precisely as indicated by broken lines in FIG. 13C. The center of the cross cannot therefore be detected accurately. If the head IC 475 is mounted as a bare chip, particularly, the bare chip is considerably smaller than a packaged IC, thus requiring a higher positioning precision.

In this embodiment, a T-shaped mark as shown in FIG. 13A is used as the positioning mark 476. The T-shaped positioning mark 476 consists of a horizontal line 476a and a vertical line 476b. The vertical line 476b is linked to the center of the horizontal line 476a. If the positioning mark 476 is formed by the etching process, therefore, what is sagged is only the link portion between the vertical line 476b and the horizontal line 476a as indicated by broken lines in FIG. 13A. As the upper portion of the horizontal line 476a is a sag-less straight line, the position in the Y direction can be detected accurately with this upper portion. If the position in the Y direction is recognized accurately, the position in the X direction can be precisely detected using the sag-less portion of the vertical 476b.

Even if a small bare chip is used for the head IC 475, the head IC 475 can be mounted accurately by the automatic mounting machine using the positioning marks 416.

A description will now be given of a process of plating the lands 470 and 474 of the FPC 47 with gold. The lands 470 of the head connecting portion 47a and the lands 474 of the head IC mount area 473 are formed by etching copper. The copper patterns are plated with gold for bonding with gold wires.

The gold plating requires that a current should be supplied to the lands 470 and 474. The FPC 47 should therefore be provided with lead lines for the plating process. Since, the lands 470 and the lands 474 are connected by the connecting lines of the aforementioned flexible portion 47b, the lands 470 of the connecting portion 47a have only to be connected to an external current source.

According to the prior art, leads are provided at the individual lands 470 of the connecting portion 47a of the FPC 47 and are coupled into a single terminal inside the FPC 47. By connecting an external power supply to this terminal, a current can be supplied to all the lands 470 and 474 to accomplish the plating. After the plating, holes are bored through that coupled portion of the FPC 47 to separate the leads from one another.

This method needs space for the holes in the FPC 47 for separating the plated leads. But, there are demands for the improved disk installing density of the magnetic disk apparatus and the high-density formation of the connecting lines, etc. on the FPC 47, as mentioned earlier. It is thus difficult to provide the leads-separating holes.

This embodiment overcomes the above problem in the following manner. Plated leads 1 linked to the individual lands 470 of the head connecting portion 47a of the FPC 47 are not coupled together in the FPC 47 as shown in FIG. 15. The ordinary plating process is carried out when the FPC 47 is still a base plate BS as shown in FIG. 14. More specifically, etching is performed on the base plate BS having a copper layer formed on a resin base, thus forming the aforementioned lands, connecting lines, etc. After the base plate BS is subjected to the plating process, it is cut into the FPC 47 having the shape as shown in FIG. 14.

In the plating process, the plated leads 1 from the lands 470 are connected together by a clip SE to which a power supply PW is connected. The current from the power supply PW is supplied to the individual plated leads 1 through the clip SE. Accordingly, the current is supplied to the individual lands 470 and 474 connected to the plated leads 1 to plate those lands with gold. As the plated leads 1 are separated on the FPC 47, it is unnecessary to separate the leads 1 after the gold plating process. Unlike in the prior art, therefore, it is unnecessary to provide extra space for the leads-separating holes, thus ensuring high-density patterning of the FPC 47.

Figure 16:
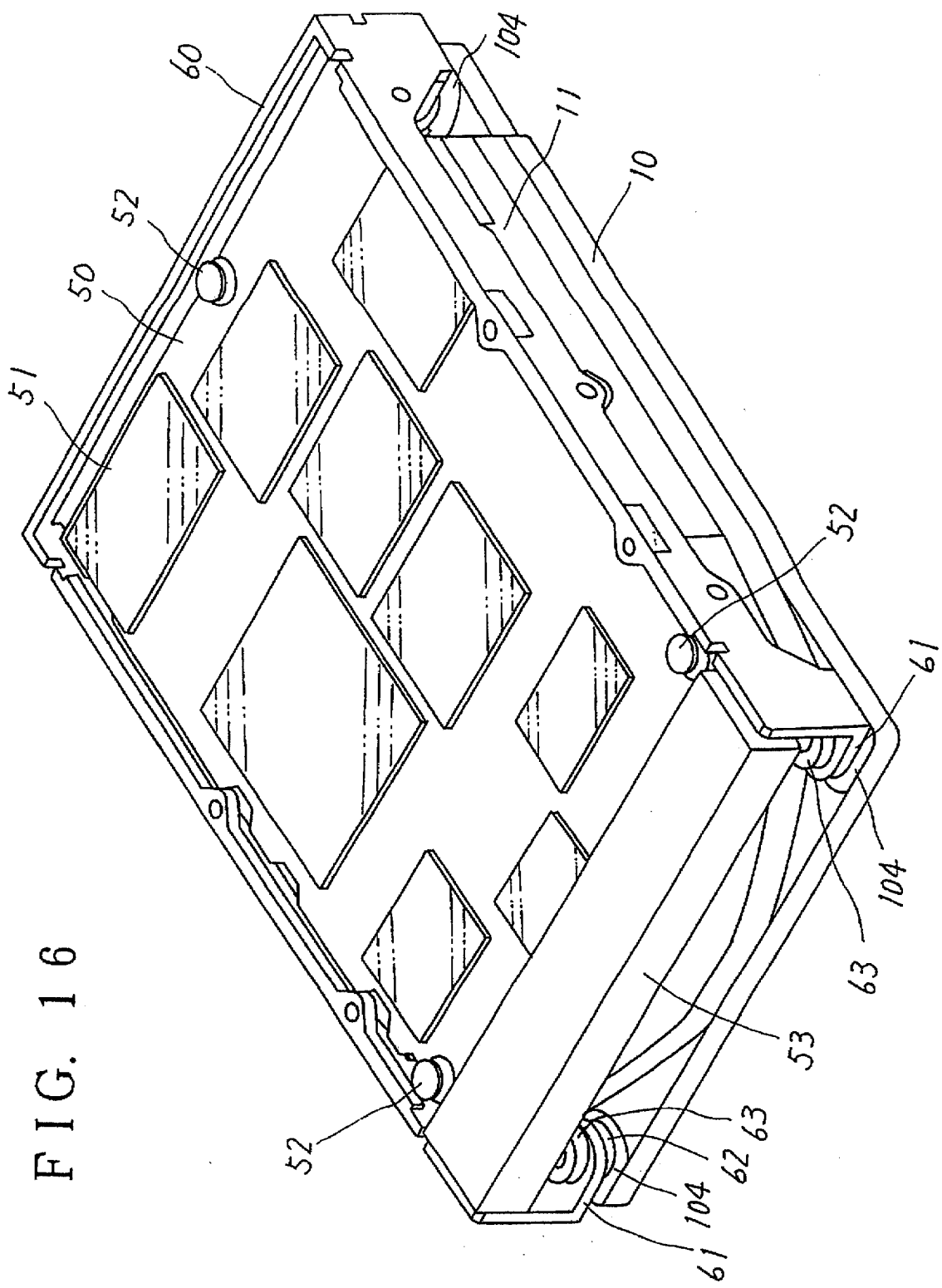
FIG. 16 is a diagram showing a printed circuit board attached to a magnetic disk drive.
Figure 17:
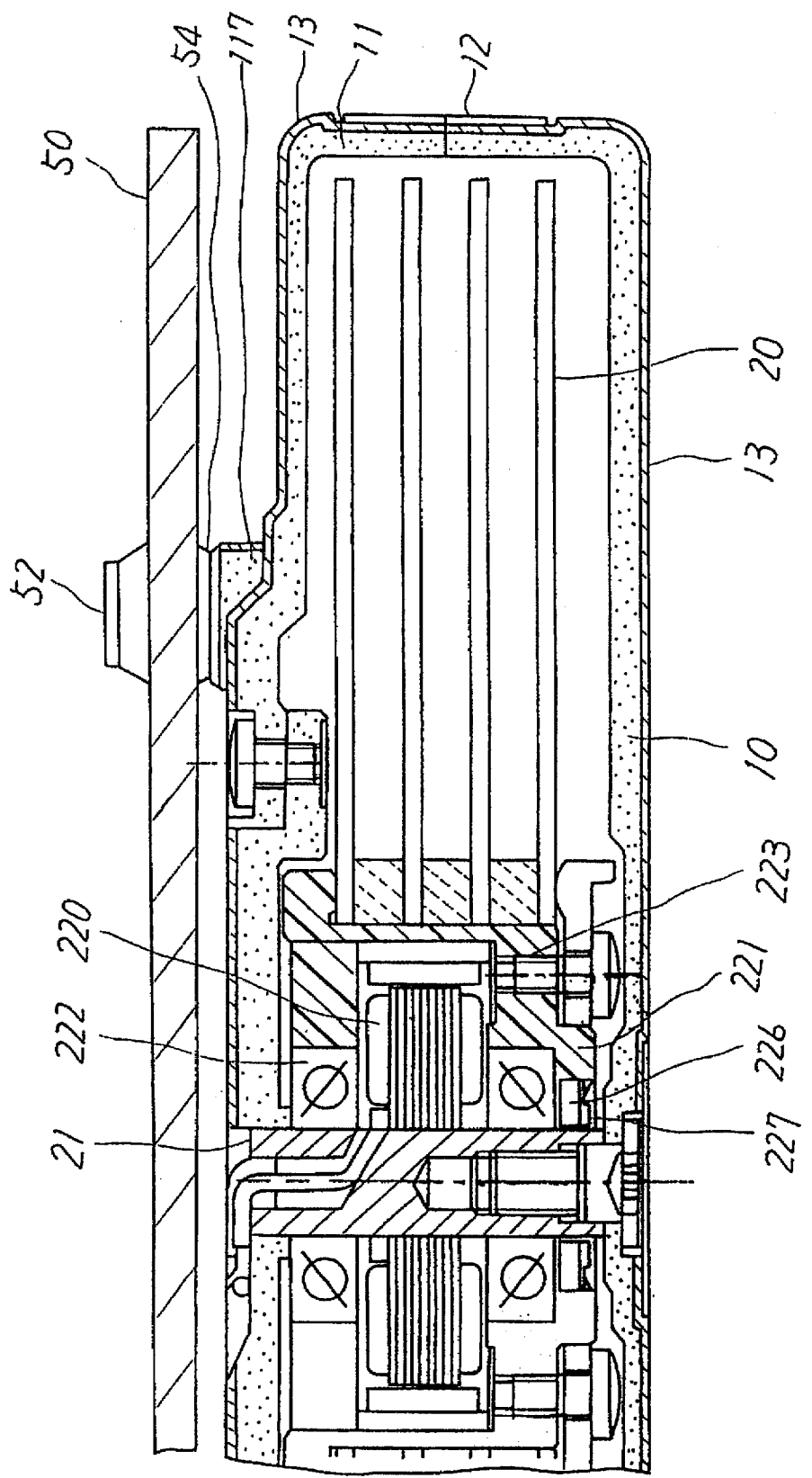
FIG. 17 is a diagram showing the connection between the printed circuit board and the magnetic disk drive.
Figure 18:
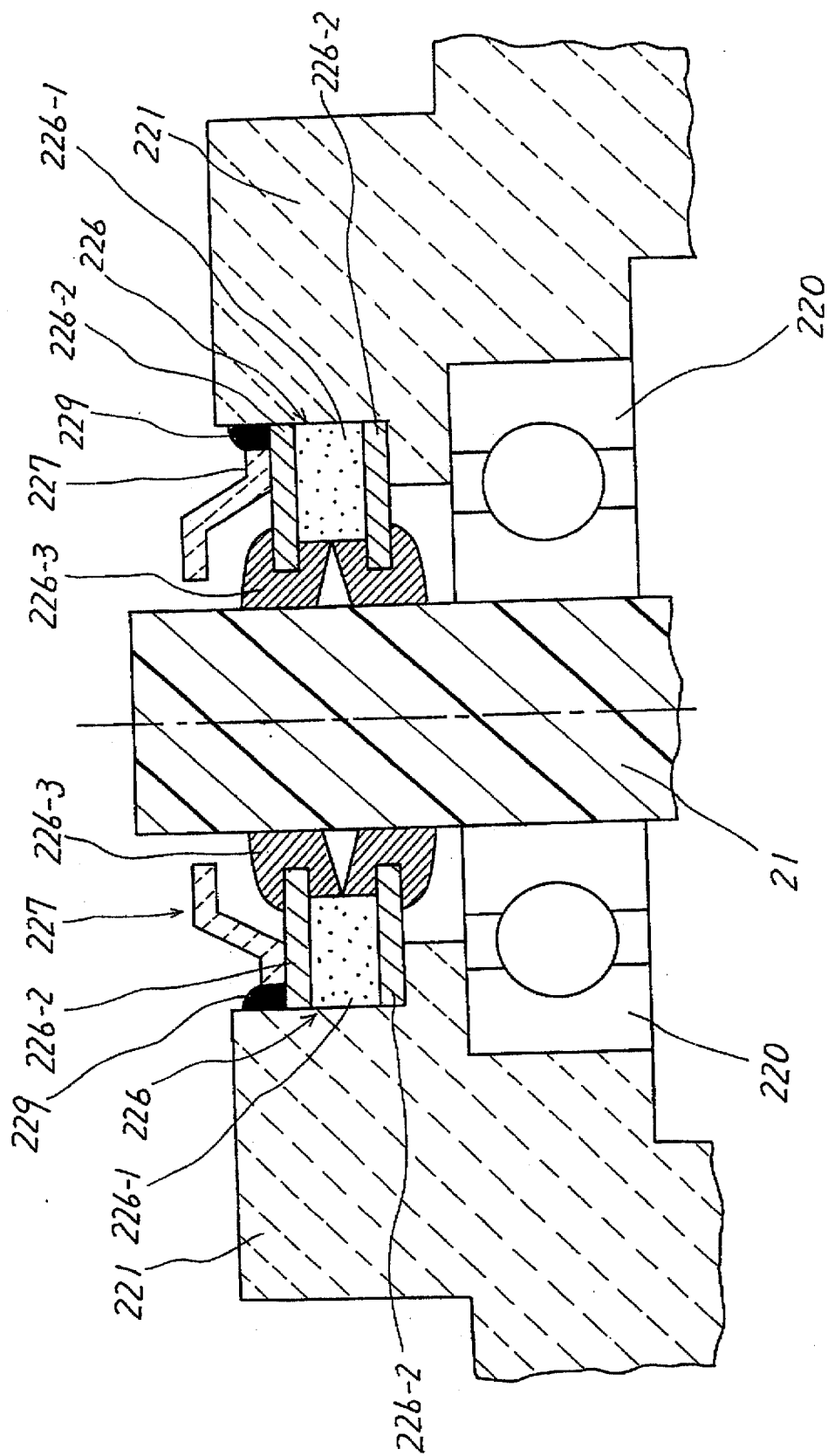
FIG. 18 is an enlarged view of a magnetic seal mechanism in FIG. 17.
Figure 19:
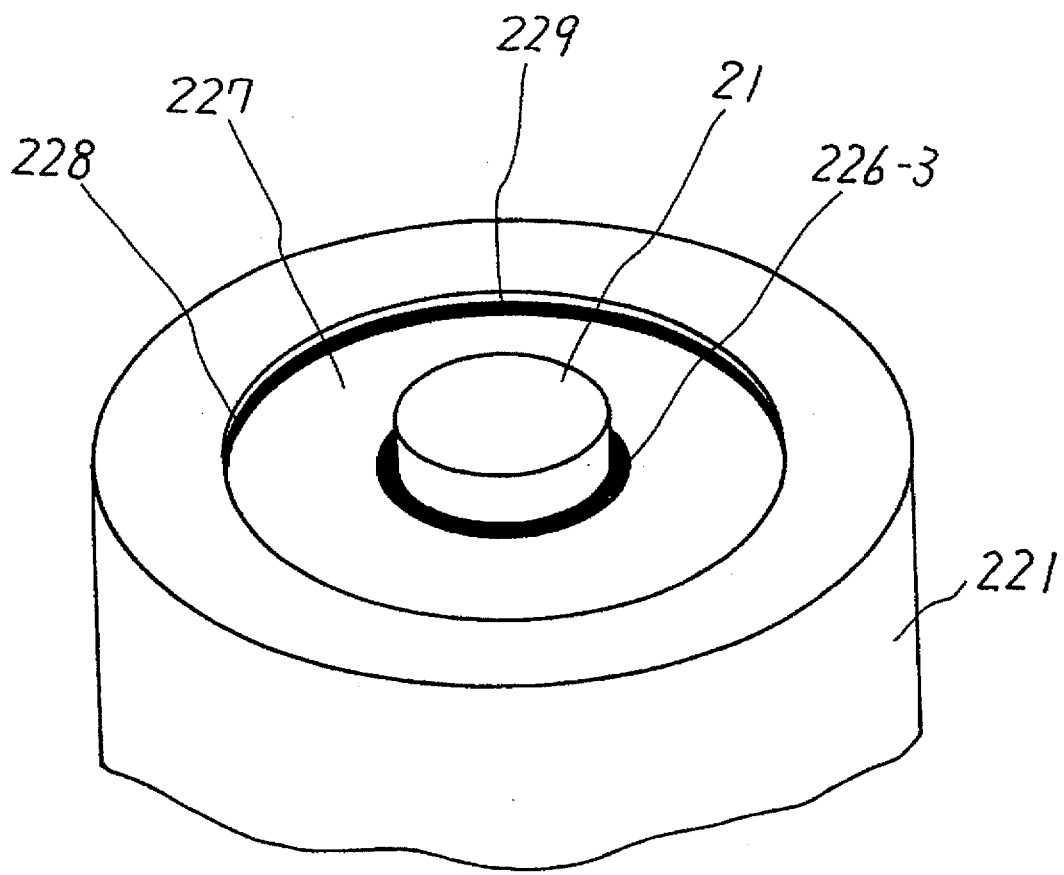
FIG. 19 is a perspective view of the magnetic seal mechanism in FIG. 18.

FIG. 16 is a diagram showing a printed circuit board attached to a magnetic disk drive, FIG. 17 illustrates the printed circuit board in FIG. 16 connected to the magnetic disk drive, FIG. 18 is an enlarged view of a magnetic seal mechanism in FIG. 17, and FIG. 19 is a perspective view of the magnetic seal mechanism in FIG. 18.

As shown in FIG. 16, a printed circuit board 50 has many integrated circuits 51, such as a servo controller, a control processor, a memory and a demodulator, mounted thereon. Provided at the distal end of the printed circuit board 50 is a connector 53 for connection to an external unit. This printed circuit board 50 is mounted on the base 11 of the magnetic disk drive by pins 52. In the diagram, the printed circuit board 50 is secured to the base 11 at three positions by the pins 52.

A holder 60 is provided so as to surround the printed circuit board 50. This holder 60 has attachment metal fittings 61 at the four corners as shown in FIG. 16. The metal fittings 61 are positioned in mount holes 104 in the cover 10 of the magnetic disk drive with vibration absorbing rubbers 62 in between, and screws 63 are fastened to the metal fittings 61. Accordingly, the holder 60 is attached to the cover 10 of the magnetic disk drive.

The holder 60 serves as a guide at the time the magnetic disk drive is inserted through a slot in a computer or the like, and also secures the magnetic disk drive in the slot. The holder 60 also serves as a protecting member for the printed circuit board 50.

In this magnetic disk apparatus, MR heads are used as the read heads in the magnetic heads 30 as mentioned earlier. If the potential difference between the MR head and the associated magnetic disk 20 is large, the MR head is likely to be damaged by the discharging phenomenon between the MR head and magnetic disk 20. This MR head is applied with a source voltage (e.g., 5 V) from the printed circuit board 50 through the FPC 47.

However, no voltage is applied to the magnetic disk 20. This produces a potential difference between the MR head and the magnetic disk 20, so that the MR head is likely to be damaged. It is therefore necessary to provide some means to eliminate this potential difference between the magnetic disk 20 and the MR head.

In this embodiment, the source voltage potential of the printed circuit board 50 is given to the magnetic disks 20. As shown in FIG. 17, a land 54 is provided at the position on the printed circuit board 50 which corresponds to a mount block 117 of the base 11. The source voltage potential is given to this land 54 on the printed circuit board 50. At the time the printed circuit board 50 is mounted on the base 11, the land 54 is put in contact with the mount block 117 of the base 11.

Consequently, the source voltage potential of the printed circuit board 50 is supplied to the base 11 of the magnetic disk drive. Since the base 11 is electrically connected to the shaft 21 of the spindle motor 22, the shaft 21 also has the source voltage potential. The magnetic disks 20 are provided on the motor hub 221 and are electrically connected to this motor hub 221. To supply the potential to the magnetic disks 20, conduction should be established between the shaft 21 and the motor hub 221.

The motor hub 221 is provided on the shaft 21 via the bearings 222 as shown in FIG. 17. As the oil is insulative, the bearings 222 cannot be used to provide the conduction between the shaft 21 and the motor hub 221. A magnetic seal mechanism 226 is disposed above the bearings 222. This magnetic seal mechanism 226 is provided to prevent the magnetic force of the internal drive coil 220 from affecting the read/write operation of the magnetic heads 30. Thus, the conduction between the motor hub 221 and the shaft 21 is established by using the magnetic seal mechanism 226.

This will be further described with reference to FIG. 18 which is an enlarged view of the magnetic seal mechanism. The magnetic seal mechanism 226 comprises two pieces 226-2 of ferrite provided on both sides of a magnet 226-1. A magnetic fluid 226-3 consisting of iron oxide and a lubricant is provided between the tool pieces 226-2 and magnet 226-1 and the shaft 21. To prevent dust from sticking on the magnetic fluid 226-3, a magnetic seal cover 227 is provided.

This magnetic fluid 226-3 is conductive. Conventionally, the two pieces 226-2 are adhered to the motor hub 221 by an insulating adhesive, so that no conduction is established between the motor hub 221 and the shaft 21.

According to this embodiment, therefore, the motor hub 221 is connected to the magnetic seal cover 227 and tool pieces 226-2 by a conductive adhesive 229 as shown in FIG. 18, thus establishing the conduction between the motor hub 221 and the two pieces 226-2. The source voltage potential given to the shaft 21 is therefore supplied to the motor hub 221 via the magnetic seal mechanism 226, allowing the magnetic disks 20 to have the source voltage potential.

FIG. 19 presents a perspective view of the magnetic seal mechanism 226. What is adhered by the conductive adhesive 229 may be just a part of the outer surface of the magnetic seal cover 227, and it is preferable to use the conventional insulating adhesive 228 for the other part. Since the conductive adhesive is likely to generate harmful gas that may damage the heads when the temperature of the apparatus becomes high, it is desirable to cover the conductive adhesive 229 with an insulating adhesive that does not generate harmful gas.

Figure 20:
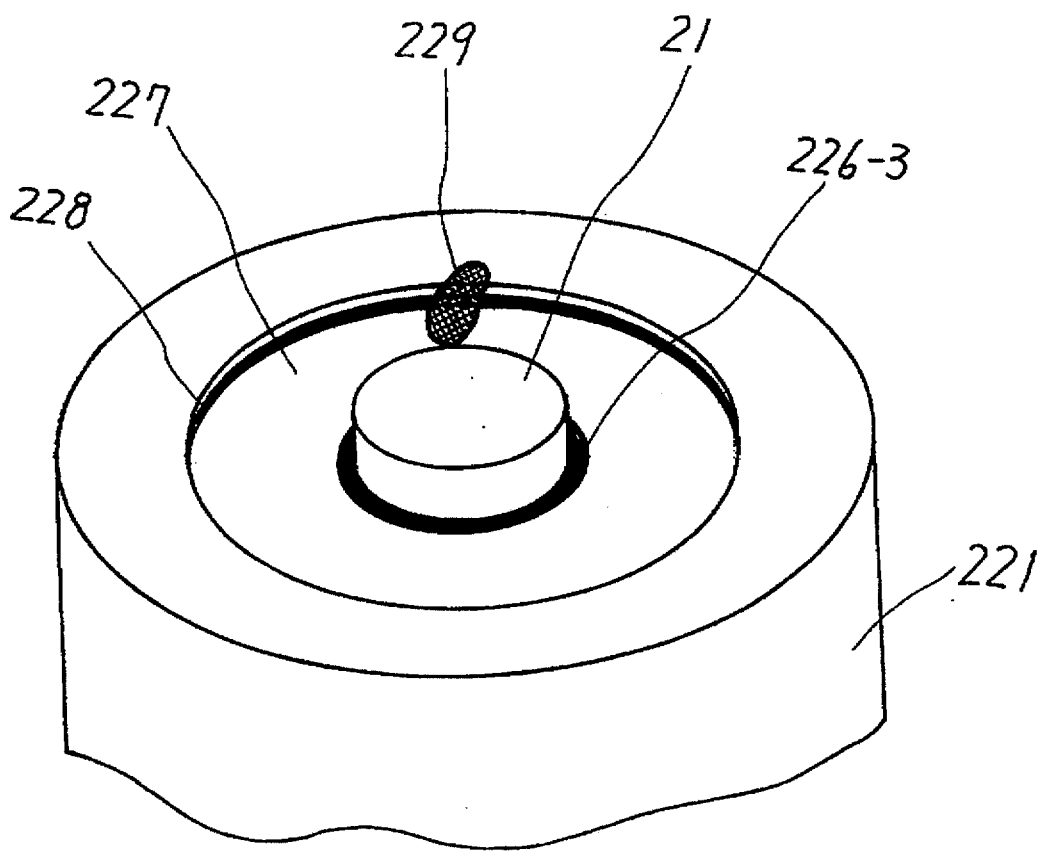
FIG. 20 is a perspective view showing another example of the magnetic seal mechanism.
Figure 21A:
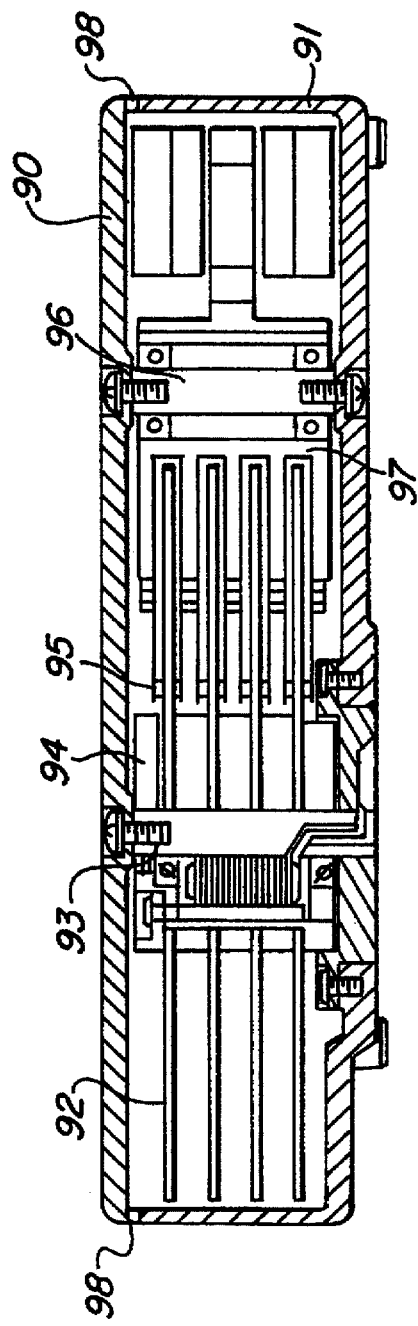
FIGS. 21A, 21B and 21C are explanatory diagram of prior art.
Figure 21B:
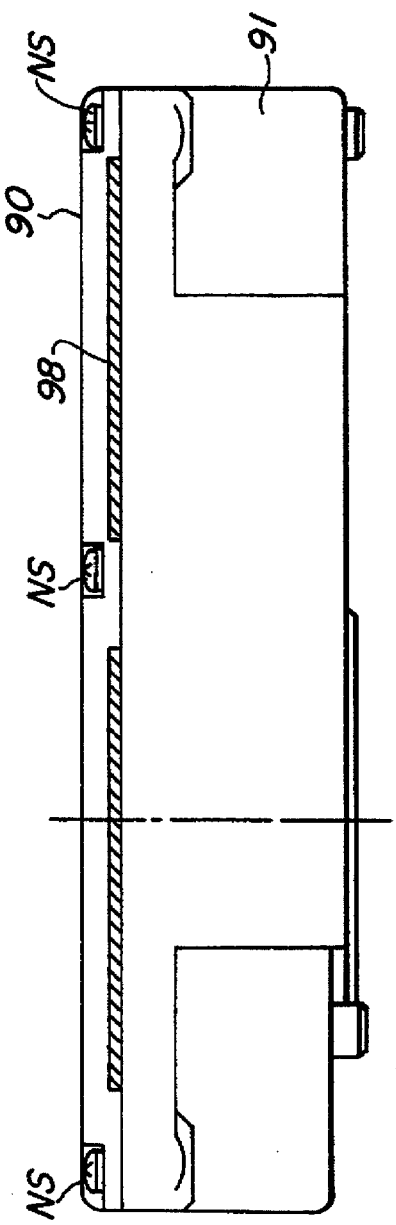
Figure 21C:
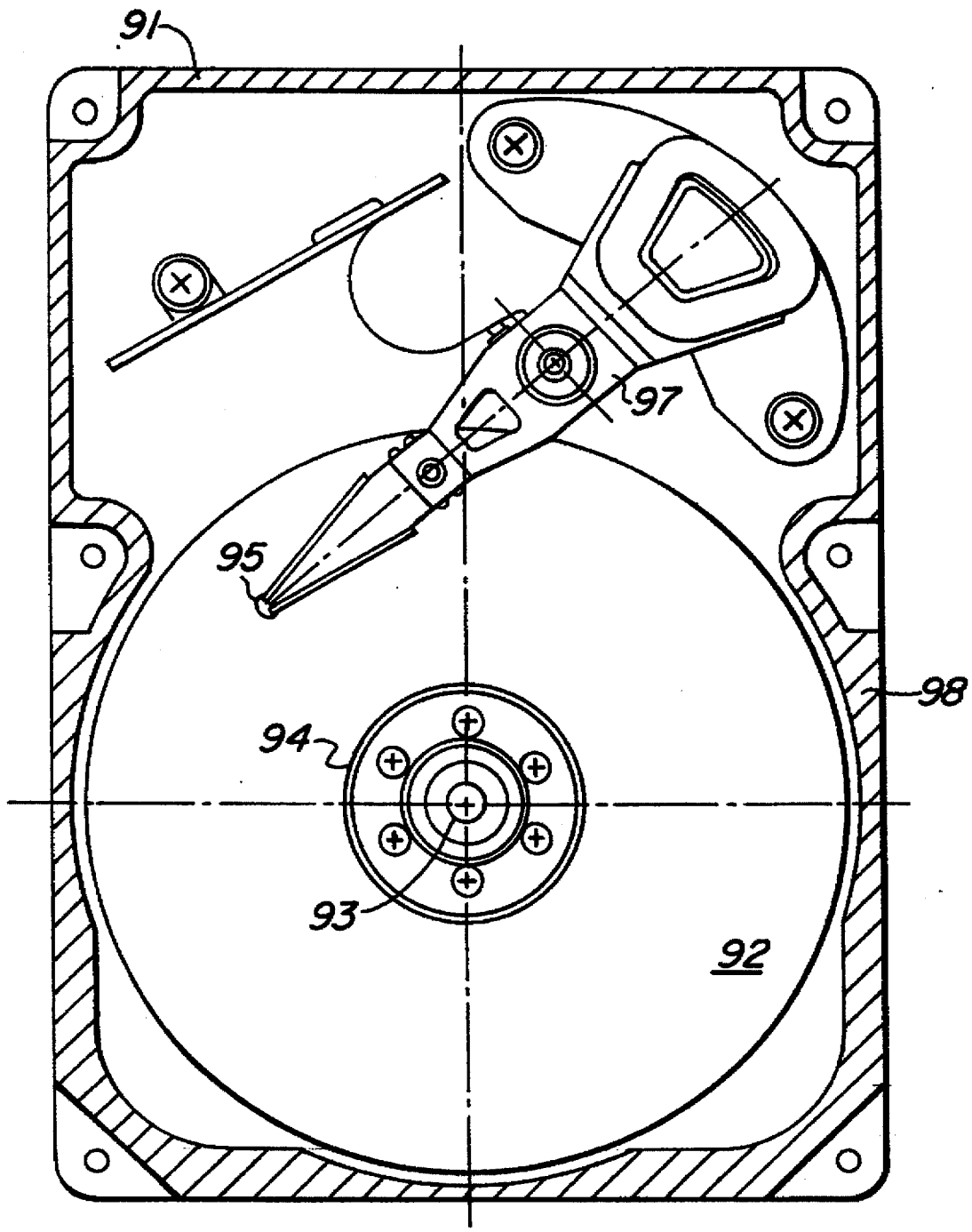

FIG. 20 shows another example for establishing the conduction of the magnetic seal mechanism. In this example, after the motor hub 221 is adhered to the magnetic seal cover 227 and two pieces 226-2 with the insulating adhesive 228, the conductive adhesive 229 is coated over the motor hub 221 and the magnetic seal cover 227. In this case, as in the example shown in FIG. 19, it is desirable to cover the conductive adhesive 229 with an insulating adhesive that does not generate harmful gas.

With the above structure, the potential of the printed circuit board 50 can be given to the magnetic disks 20. As the potential of the MR head of the magnetic head 30 can be set to the same potential of the magnetic disk 20, the MR head can be prevented from being damaged by the discharge between the MR head and magnetic disk 20.

Further, an insulating paint 13 is coated on the cover 10 and base 11 of the magnetic disk drive as shown in FIG. 17. This prevents the cover 10 and base 11 from being grounded by a hand or the like touching them. Even if a hand or the like touches the cover 10 and base 11, therefore, the potential from the printed circuit board 50 can surely be supplied to the magnetic disks 20.

The present invention is not limited to the above-described embodiment. First, although this embodiment has been described with reference to the case where four magnetic disks are installed in the magnetic disk apparatus, the number of magnetic disks to be installed may be selected as needed. Secondly, although lands are provided on the printed circuit board to establish electric connection between the printed circuit board and the base of the magnetic disk drive, the electric connection may be established by the use of lead lines or the like.

Although only one embodiment and few examples of the present invention have been described herein, it should be apparent to those skilled in the art that the present invention may be embodied in many other specific forms without departing from the spirit or scope of the invention.

In short, according to the present invention, the case for accommodating the magnetic disks and rotary actuator is constituted by the cover and base both of which have upright portions, so that the rigidities of the cover and base can be enhanced. Thus, the internal accommodation space can be increased by making the cover and base thinner. Even if the cover and base are made thinner, it is possible to prevent the spindle shaft and actuator shaft from tilting, thus ensuring a stable read/write operation.

What is claimed is:

1. A magnetic disk apparatus comprising:

a case defining accommodation space inside;

an insulating layer provided around said case;

at least one magnetic disk disposed in said accommodation space;

a spindle motor rotatable around a shaft having both ends secured to said case, for rotating said at least one magnetic disk;

magnetic heads each including a magneto-resistive element for reading data from said magnetic disk when a voltage is applied thereto and an inductive element for writing data on said at least one magnetic disk;

a rotary actuator for supporting said magnetic heads at a distal end, said rotary actuator being rotatable around a shaft having both ends secured to said case; and a printed circuit board provided on the exterior of said case and having a control circuit mounted thereon for controlling said magnetic heads, said rotary actuator and said spindle motor, said printed circuit board having a nonzero source voltage potential; and means electrically connecting said printed circuit board to said case to supply said nonzero source voltage potential of said printed circuit board to said at least one magnetic disk via said case.

2. The magnetic disk apparatus according to claim 1, wherein said means electrically connecting includes lands on said printed circuit board which contact said case to supply said nonzero source voltage potential of said printed circuit board to said at least one magnetic disk via said case.

3. The magnetic disk apparatus according to claim 2, wherein said means electrically connecting includes a mount block on said case for being contacted to said land.

4. The magnetic disk apparatus according to claim 1, wherein said spindle motor has:

a motor hub rotatable around said shaft of said motor; and a conductive member for electrically connecting said shaft of said motor to said motor hub.

5. The magnetic disk apparatus according to claim 2, wherein said spindle motor has:

a motor hub rotatable around sa-id shaft of said motor; and a conductive member for electrically connecting said shaft of said motor to said motor hub.

* * * * *

UNITED STATES PATENT AND TRADEMARK OFFICE
CERTIFICATE OF CORRECTION

PATENT NO. : 5,673,159
DATED : September 30, 1997
INVENTOR(S) : Jinbo et al.

It is certified that error appears in the above-identified patent and that said Letters Patent is hereby corrected as shown below:

Column 5, line 28, delete "Magnet-Resistive" and insert --Magneto-Resistive-- therefor Column 8, line 32, delete "is difficult"

Column 10, line 54, delete "tool" and insert --two-- therefor

Column 10, line 63, delete "tool" and insert --two-- therefor

Column 12, line 44, delete "far" and insert --for-- therefor

UNITED STATES PATENT AND TRADEMARK OFFICE
CERTIFICATE OF CORRECTION

PATENT NO. : 5,673,159
DATED : September 30, 1997
INVENTOR(S) : Jinbo et al.

It is certified that error appears in the above-identified patent and that said Letters Patent is hereby corrected as shown below:

Column 12, line 48, delete "sa-id" and insert

--said-- therefor

Signed and Sealed this

Eighth Day of September, 1998

Attest:

BRUCE LEHMAN

Attesting Officer

Commissioner of Patents and Trademarks